(12) United States Patent
Hatori

(10) Patent No.: US 7,697,167 B2
(45) Date of Patent: Apr. 13, 2010

(54) COLOR PROCESSING METHOD AND APPARATUS

(75) Inventor: Kazushige Hatori, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 797 days.

(21) Appl. No.: 11/470,688

(22) Filed: Sep. 7, 2006

(65) Prior Publication Data

US 2007/0058181 A1 Mar. 15, 2007

(30) Foreign Application Priority Data

Sep. 9, 2005 (JP) ............................. 2005-262985

(51) Int. Cl.
*H04N 1/40* (2006.01)
(52) U.S. Cl. ...................... 358/2.1; 358/1.16
(58) Field of Classification Search .................. 358/2.1, 358/1.9, 1.16–1.17, 500, 516–520, 523
See application file for complete search history.

(56) References Cited

U.S. PATENT DOCUMENTS

| 5,502,580 | A | 3/1996 | Yoda et al. |
| 6,850,342 | B2 * | 2/2005 | Woolfe et al. ................. 358/1.9 |
| 2002/0163669 | A1 * | 11/2002 | Yamazaki et al. .......... 358/3.23 |
| 2004/0233484 | A1 | 11/2004 | Seko et al. |
| 2007/0081177 | A1 * | 4/2007 | Um et al. ...................... 358/1.9 |
| 2007/0086028 | A1 * | 4/2007 | Cho et al. ..................... 358/1.9 |

FOREIGN PATENT DOCUMENTS

| JP | 7-154623 | 6/1995 |
| JP | 2003-8915 | 1/2003 |

OTHER PUBLICATIONS

Office Action dated Nov. 9, 2009 in JP 2005-262985.

* cited by examiner

*Primary Examiner*—Thomas D Lee
*Assistant Examiner*—Stephen M Brinich
(74) *Attorney, Agent, or Firm*—Fitzpatrick, Cella, Harper & Scinto

(57) ABSTRACT

Upon re-creating a conversion table, which is created for each device and viewing conditions, so as to absorb variations of the color reproduction characteristic of a device, data indicating the relationship between color signals on the color space of the device whose color reproduction characteristic has varied, and color signals on a device-independent color space must be obtained again. Hence, input data is converted into output data using conversion tables for input and output conversions, which are created for an input or output device and for each conversion setting, and a conversion adjustment table. The conversion adjustment table is modified in correspondence with variations of the color reproduction characteristic of the input or output device or color correction for the input or output device.

10 Claims, 36 Drawing Sheets

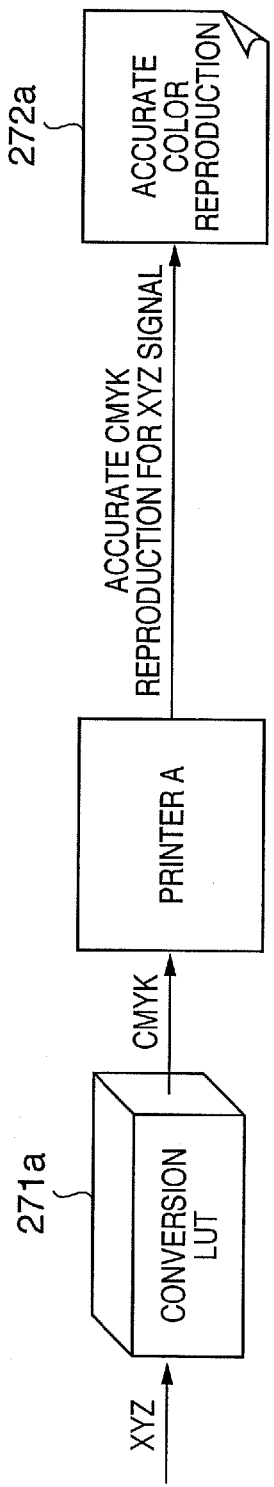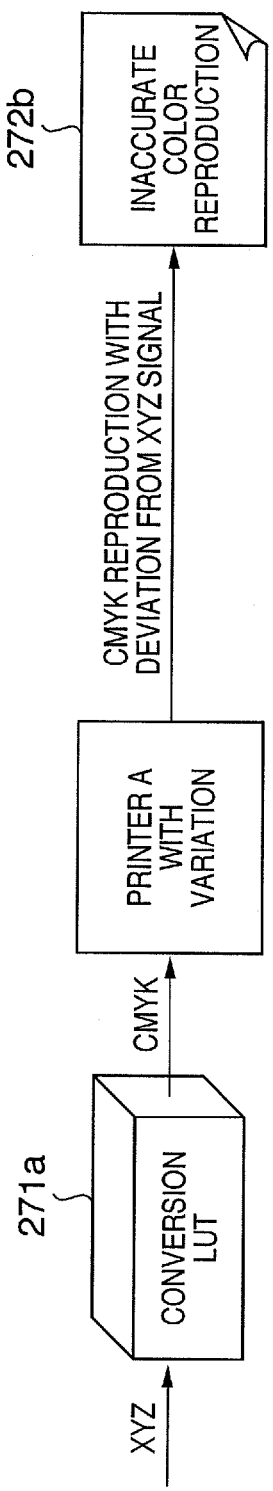

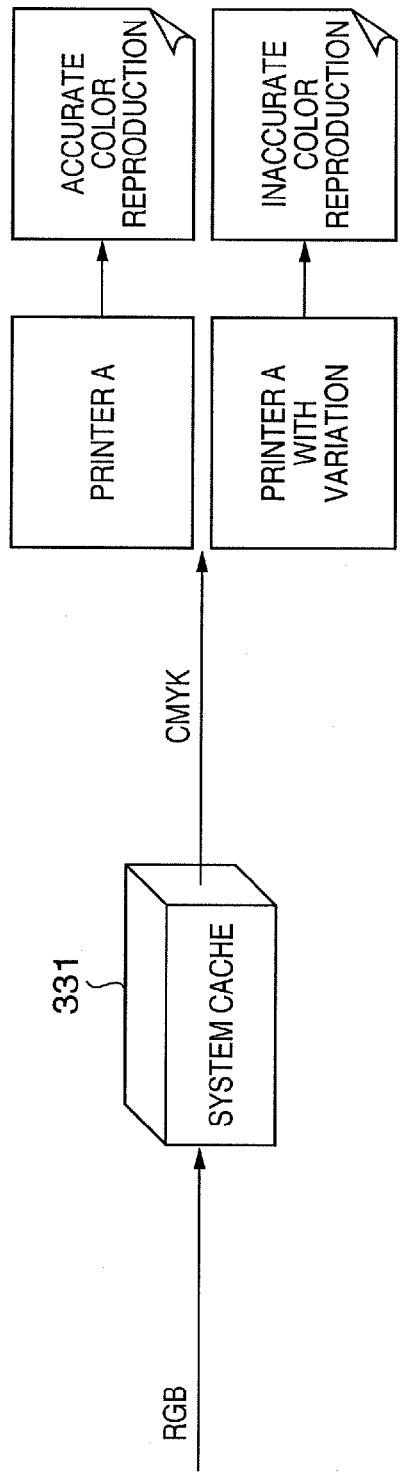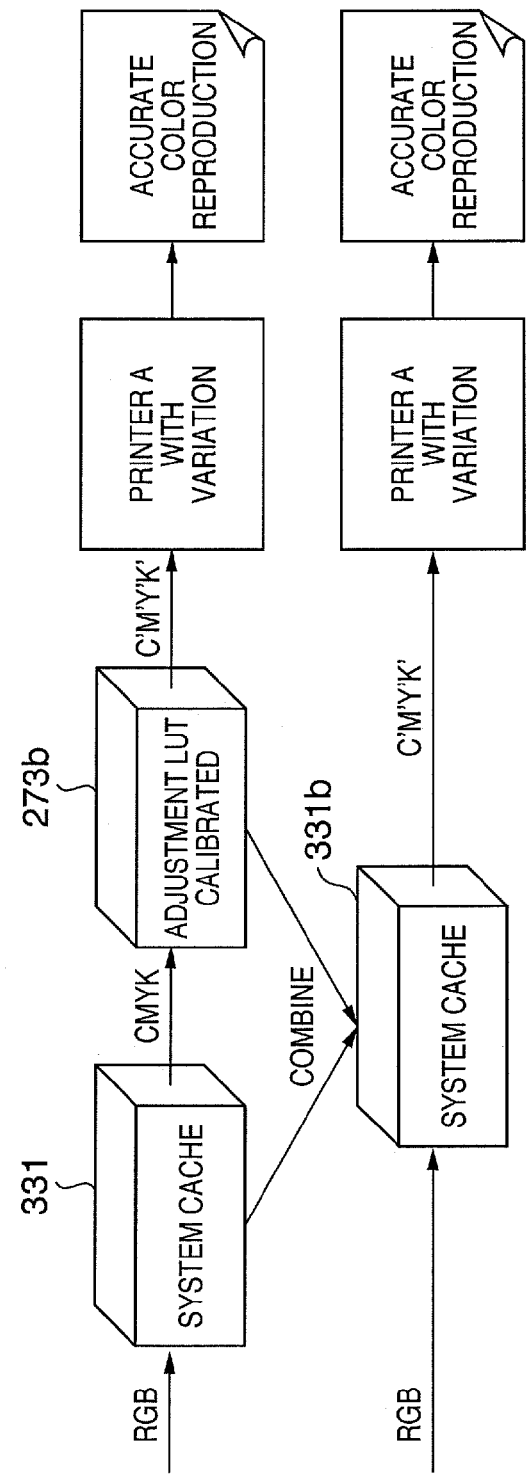

COLOR PROCESSING METHOD AND APPARATUS

BACKGROUND OF THE INVENTION

1. Field of the Invention

The present invention relates to color processing for converting image data of an input device into that for an output device.

2. Description of the Related Art

FIG. 1 shows the concept of color matching.

Input RGB data is converted into XYZ data of a device-independent space using an input profile 1. The XYZ data is converted into CMYK data of a color space depending on an output device using an output profile 2.

Conversion using the output profile 2 includes gamut mapping processing and conversion processing that converts the XYZ data which has undergone the gamut mapping into CMYK data. The output device cannot express colors outside the color reproduction range (to be referred to as a "gamut" hereinafter). Hence, the gamut mapping processing maps an input color to a color within the gamut of the output device.

In color matching, a reference white point and ambient light are fixed. For example, an ICC (International Color Consortium) profile specifies a profile connection space (PCS) in D50. For this reason, when an input document or print is viewed under a light source with the D50 characteristic, accurate color reproduction is guaranteed. However, under light sources with other characteristics, accurate color reproduction is not guaranteed.

The color reproduction characteristic of a printer changes depending on ambient conditions such as a temperature, humidity, and the like when the printer is in operation, and the aging it has suffered so far. The printer requires calibration for calibrating the conversion processing conditions according to the changed color reproduction characteristic.

Likewise, a scanner also requires calibration before accurate scanning is to be done, due to ambient conditions such as a temperature, and the like when the scanner is in operation, and the aging it has suffered so far.

The conversion conditions of color matching must be calibrated according to a change in color reproduction characteristic of the device. However, it is not easy to create the conversion conditions since data indicating the relationship between color signals of the color space of the device whose color reproduction characteristic has varied, and those of the device-independent color space must be obtained again.

SUMMARY OF THE INVENTION

The first aspect of the present invention discloses a method of applying, to data of a color space depending on an input device, an input conversion for converting into data on a device-independent color space, a gamut conversion for converting into data on a gamut of an output device, and an output conversion for converting into data on a color space depending on the output device, comprising the steps of: converting input data into output data using conversion tables for the input conversion and the output conversion, which are created for each of the input device and output device and for each conversion setting, and a conversion adjustment table; and modifying the conversion adjustment table in correspondence with a variation of a color reproduction characteristic of one of the input device and the output device, or color correction for one of the input device and the output device.

According to the present invention, color processing corresponding to variations of the color reproduction characteristics of input and output devices or color correction for input and output devices can be implemented without correcting a conversion table which is created for each input or output device, and each conversion setting.

Further features of the present invention will become apparent from the following description of exemplary embodiments with reference to the attached drawings.

BRIEF DESCRIPTION OF THE DRAWINGS

FIGS. 21A to 21C are views for explaining the relationship between the conversion LUTs and color reproduction of printer A;

FIGS. 33A and 33B are views for explaining a combination of a system cache and adjustment LUT according to the sixth embodiment;

DESCRIPTION OF THE EMBODIMENTS

Image processing according to preferred embodiments of the present invention will be described in detail hereinafter with reference to the accompanying drawings.

Concept of Color Matching

Figure 1:
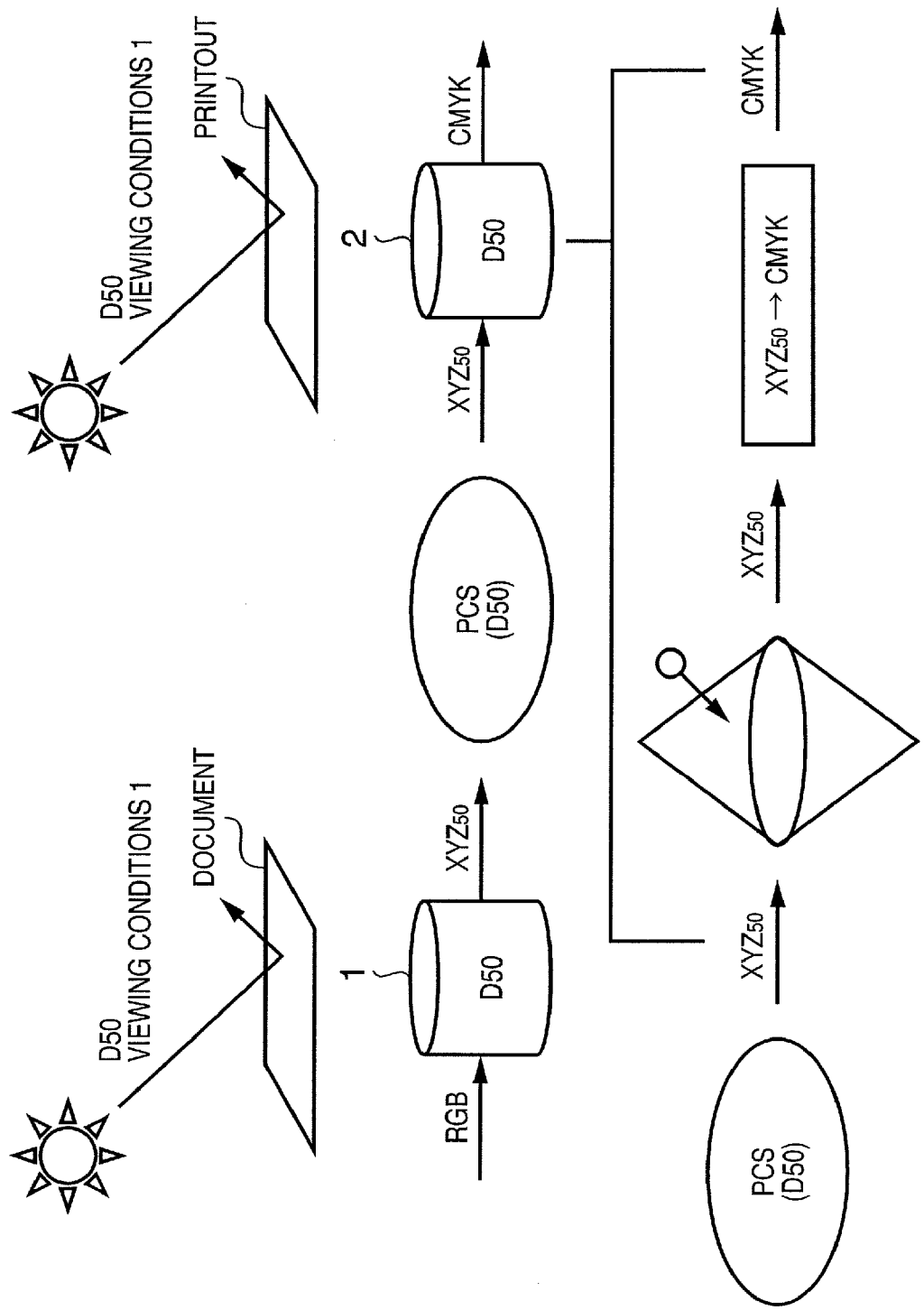
FIG. 1 shows the concept of color matching.
Figure 2:
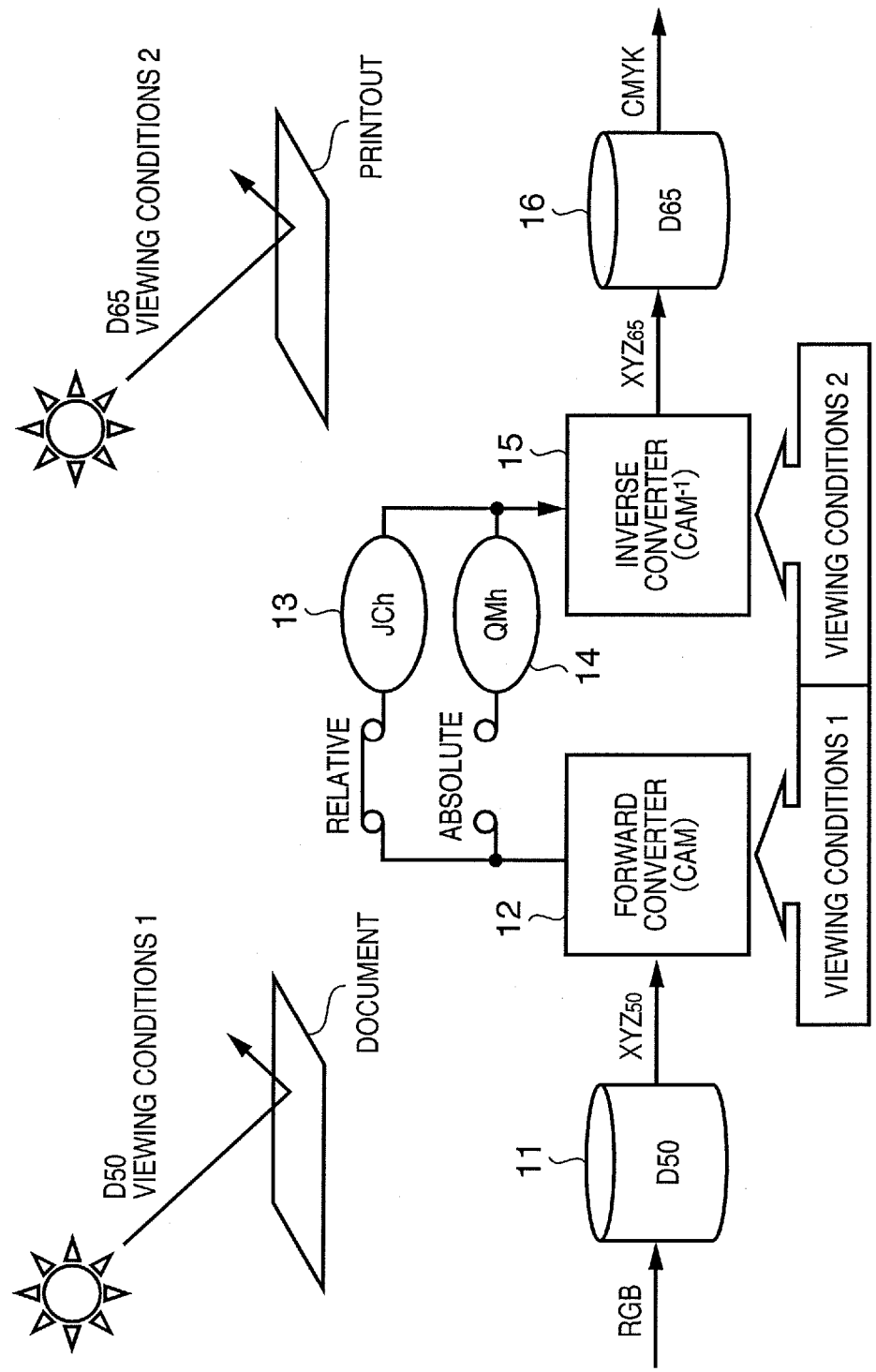
FIG. 2 is a view for explaining the concept of color matching processing according to an embodiment of the present invention.

FIG. 2 is a view for explaining the concept of color matching processing in the embodiments to be described hereinafter.

Conversion processing 11 which performs processing using a conversion matrix or conversion lookup table (LUT) converts data depending on an input device into device-independent color space data based on the white point reference of ambient light on the input side. A forward color appearance converter (CAM) 12 converts the data obtained from the conversion LUT 11 into data on a color appearance space JCh or QMh. JCh (or JCH) 13 is a color appearance space relative to reference white of ambient light. QMh (or QMH) 14 is an absolute color appearance space whose dimensions change depending on the illuminance level. An inverse color appearance converter ($CAM^{-1}$) 15 converts the data of the color appearance space JCh or QMh into device-independent color space data based on the white point reference of ambient light on the output side. Conversion processing 16 using a conversion matrix or conversion LUT converts the data obtained from the inverse converter 15 into color space data depending on an output device.

In general, a white point of ambient light under the viewing conditions is different from that of a standard light source in colorimetry of a color sample made upon creating the conversion processing conditions. For example, the standard light source used in colorimetry is D50 or D65. However, ambient light upon actual viewing of an image is not always D50 or D65, but is normally illuminating light of an incandescent lamp, fluorescent lamp, or the like, or light obtained by mixing illuminating light and sunlight. In the following description, assume that the light source characteristics of ambient light under the viewing conditions are D50, D65, and D93 for the sake of simplicity. Note that the XYZ values of a white point on a medium may be set as a white point.

Arrangement of Color Matching Processing

Figure 3:
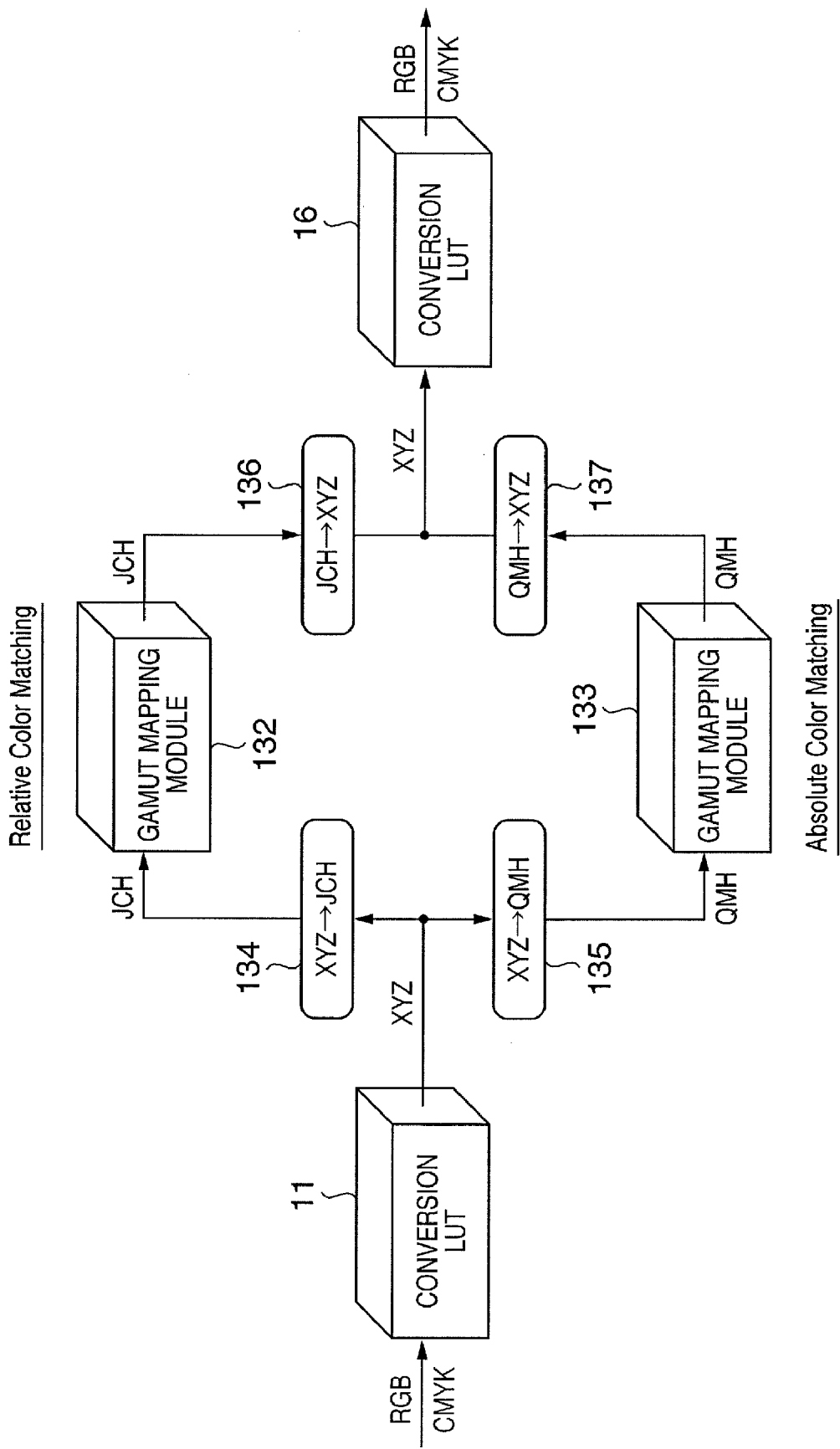
FIG. 3 is a diagram showing the arrangement of the color matching processing.

FIG. 3 is a diagram showing the arrangement of the color matching processing.

The conversion LUT 11 is an LUT created based viewing conditions 1 by a data creation unit. An LUT 132 is an LUT created on the JCH color space by a gamut mapping unit. An LUT 133 is an LUT created on the QMH color space by the gamut mapping unit. The conversion LUT 16 is an LUT created based on viewing conditions 2 by the data creation unit. The LUTs 132 and 133 may be replaced by matrices or programs which comprise gamut mapping algorithms (GMAs). These modules for performing gamut mapping will be referred to as gamut mapping modules hereinafter.

The conversion LUT 11 converts RGB or CMYK input color signals as color signals of an input device into XYZ signals as device-independent color signals under viewing conditions 1. Forward color appearance converters 134 and 135 respectively convert the XYZ signals into color appearance signals JCH and QMH based on viewing conditions 1 (a white point of the D50 light source, the illuminance level, the state of surrounding light, and the like). The JCH space is selected in case of relative color matching, and the QMH space is selected in case of absolute color matching.

The gamut mapping modules 132 and 133 respectively map the color appearance signals JCH and QMH onto the gamut of the output device. Inverse color appearance converters 136 and 137 respectively convert the color appearance signals JCH and QMH which have undergone gamut mapping into XYZ signals as device-independent color signals under viewing conditions 2 based on viewing conditions 2 (a white point of the D65 light source, the illuminance level, the state of surrounding light, and the like). The conversion LUT 134 converts the XYZ signals into color signals depending on the output device.

RGB or CMYK signals obtained by the aforementioned processing are sent to the output device, and an image indicated by these color signals is printed. When this printout is viewed under viewing conditions 2, it appears to have the same color as an original document viewed under viewing conditions 1.

Processing of Color Appearance Model

Figure 4:
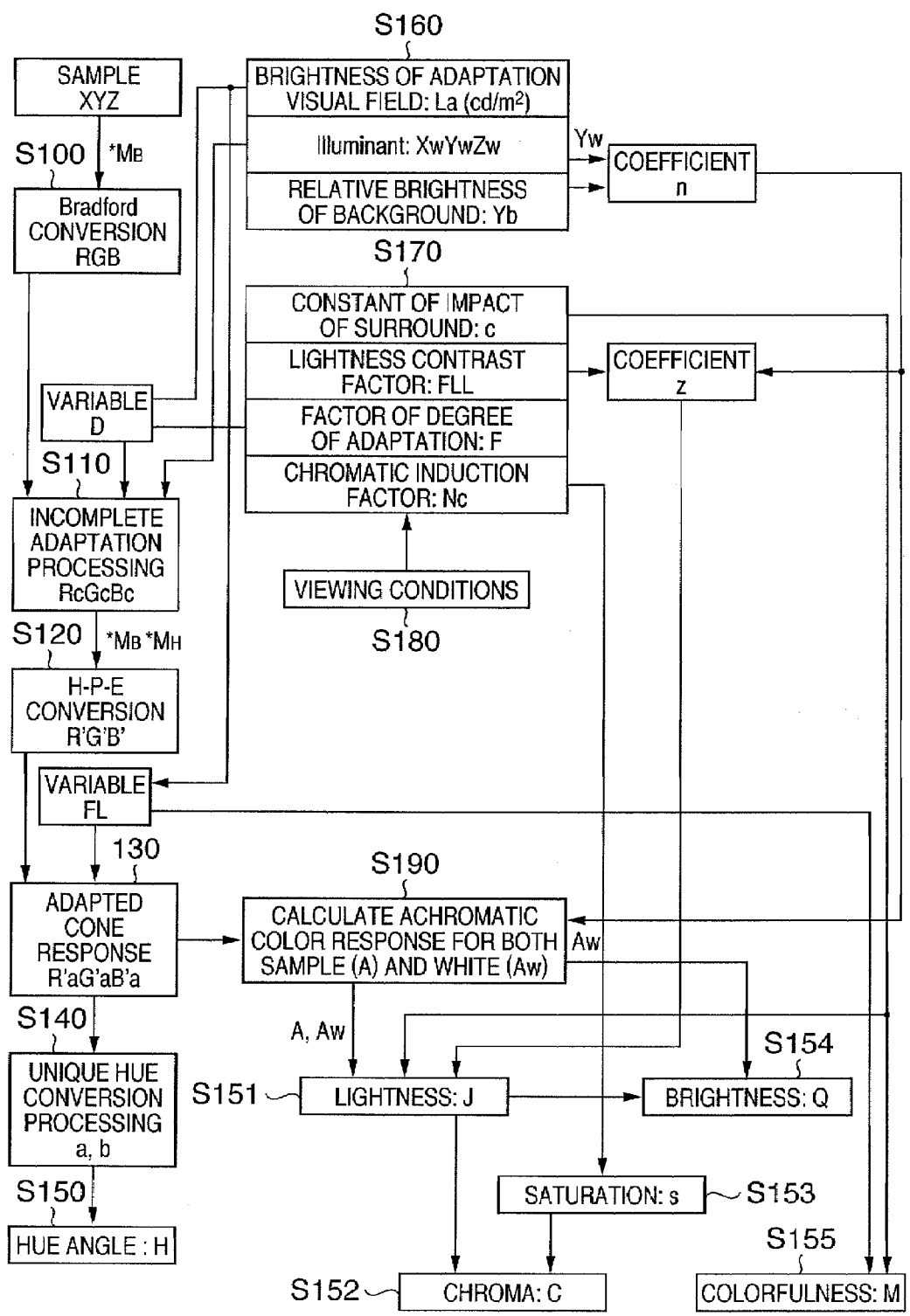
FIG. 4 is a diagram for explaining the processing contents in forward conversion of a color appearance model CIECAM02 that attains correction processing according to the viewing conditions upon viewing an input image.

FIG. 4 is a diagram for explaining the processing contents in forward conversion of a color appearance model CIECAM02 that performs correction processing (processing for converting XYZ into JCH or QMH) according to the viewing conditions upon viewing an input image.

As viewing condition information of an input image, brightness LA ($cd/m^2$) of the adaptation visual field, relative tristimulus values XYZ of a sample under the light-source conditions, relative tristimulus values XwYwZw of white light under the light-source conditions, and relative brightness Yb of the background under the light-source conditions are set (S160). Note that a value 20% of the brightness of white of the adaptation visual field is selected as the brightness LA of the adaptation visual field. Also, based on the type of viewing conditions designated in step S180, a constant c indicating the impact of surround, a chromatic induction factor Nc, a lightness contrast factor FLL, and a factor F of a degree of adaptation are set as viewing condition information of the input image (S170).

Based on the viewing condition information of the input image set in steps S160 and S170, the following processing is applied to XYZ values representing the input image.

Based on the three primary colors of Bradford considered as the physiological three primary colors of a human visual system, XYZ values are converted to obtain Bradford cone response values RGB (S100). Since human visual perception is not always completely adaptable to a viewing light source, a variable D indicating the degree of adaptation is calculated based on the brightness level and ambient conditions (LA and F). Based on this variable D and XwYwZw values, incomplete adaptation processing is applied to the RGB values to convert them into RcGcBc values (S110).

Next, based on Hunt-Pointer-Estevez three primary colors considered as the physiological three primary colors of a human visual system, the RcGcBc values are converted to calculate Hunt-Pointer-Estevez cone response values R'G'B' (S120). The degrees of adaptation of the R'G'B' values based on the stimulus intensity level are estimated to calculate adapted cone response values R'aG'aB'a according to both the sample and white (S130). In step S130, nonlinear response compression is made using a variable FL calculated based on the brightness LA of the adaptation visual field.

Subsequently, in order to obtain the correlation with color appearance, the following processing is executed.

Red-green and yellow-blue opposite color response values ab are calculated from the R'aG'aB'a values (S140), and hue H is calculated from the opposite color response values ab and an eccentricity factor S150).

A background inducing coefficient n is calculated from Yw and the relative brightness Yb of the background, and achromatic color response values A and Aw associated with both the sample and white are calculated using this background inducing coefficient n (S190). Next, lightness J is calculated based on a coefficient z calculated from the background inducing coefficient n and lightness contrast factor FLL, A, Aw, and c (S151). Subsequently, saturation S is calculated from the chromatic induction factor Nc (S153), chroma C is calculated from saturation S and lightness J (S152), and brightness Q is calculated from lightness J and white achromatic color response Aw (S154).

Also, colorfulness M is calculated from the variable FL and the constant c indicating the impact of surround (S155).

Gamut Mapping Mode Selection and Gamut Mapping

The gamut mapping mode is selected by the user via a user interface or is automatically selected by Rendering intent in the header of a profile on the source side. The gamut mapping mode is automatically selected based on the profile as follows.

"Perceptual" gamut mapping mode on the JCH color space,

"Relative Colorimetric" gamut mapping mode on the JCH color space,

"Saturation" gamut mapping mode on the JCH color space, and

"Absolute Colorimetric" gamut mapping mode on the QMH color space.

That is, the JCH space 13 shown in FIG. 2 is selected in case of relative color matching, and the QMH space 14 is selected in case of absolute color matching.

Figure 5:
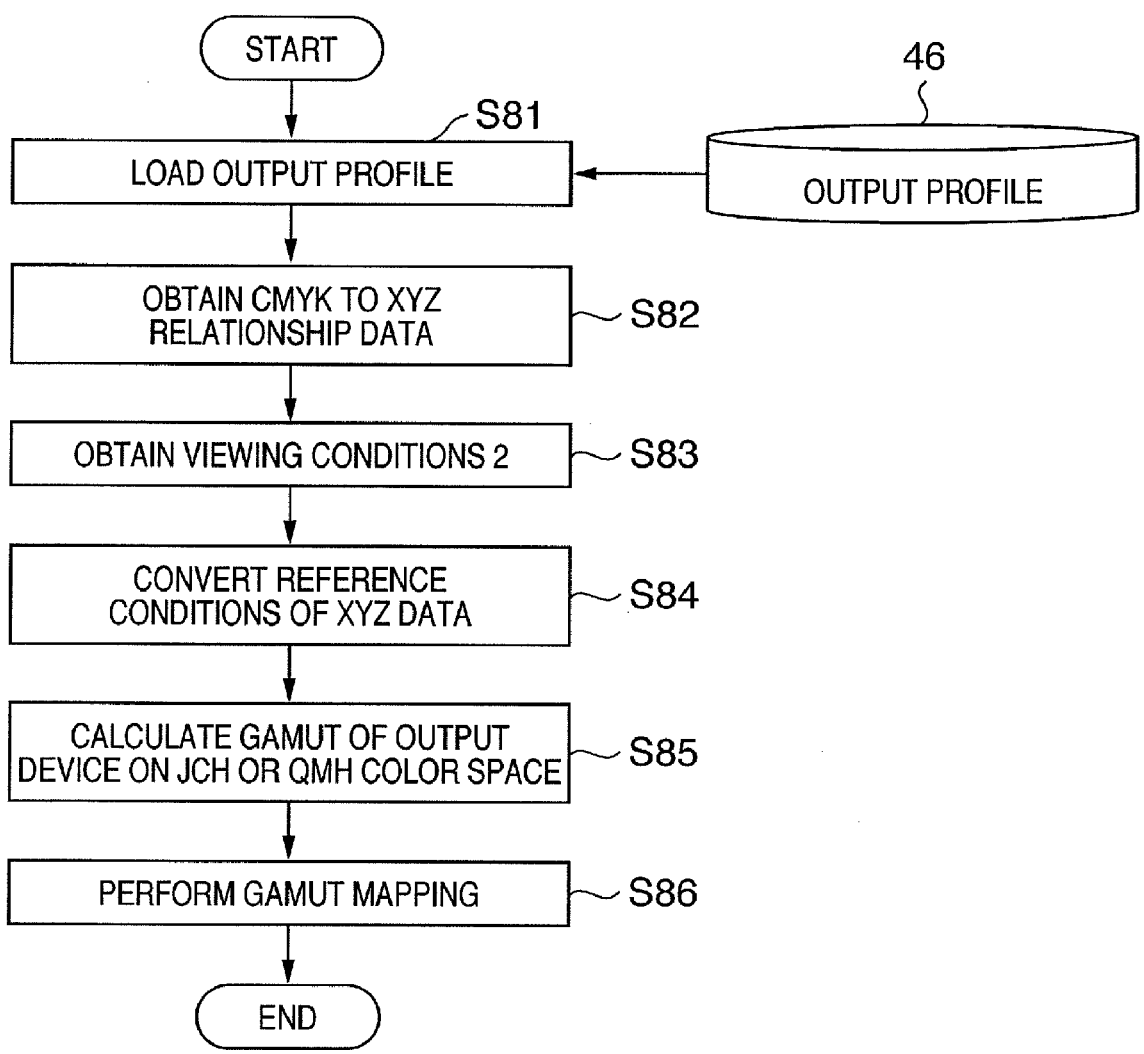
FIG. 5 is a flowchart showing processing for performing gamut mapping on a JCH or QMH color space.

FIG. 5 is a flowchart showing processing for performing gamut mapping on the JCH space 13 or QMH space 14.

In order to perform gamut mapping on the color appearance space, a profile designated by the user is loaded from an output profile 46 (S81).

In general, an ICC profile for an output device stores a determination LUT (gamut Tag) that inputs XYZ values or Lab values to determine if the values fall inside or outside of the color gamut (to be referred to as "color gamut inside/outside determination" hereinafter). However, since the XYZ values are determined with reference to D50 or D65 as the characteristics of the calorimetric light source, these values cannot be directly used in the color gamut inside/outside determination according to ambient light. Hence, in place of using the gamut Tag, CMYK to XYZ relationship data is extracted from a conversion LUT (AtoB0 Tag or the like) used to perform CMYK to XYZ conversion, which is stored in a profile (S82), and the extracted data is used to perform inside/outside determination. Since the output profile also stores viewing conditions 2, viewing conditions 2 are extracted from the output profile (S83).

The XYZ values of the CMYK to XYZ relationship data extracted in step S82 are the data determined with reference to D50 or D65 as colorimetric light. Therefore, these XYZ values must be corrected to those based on the ambient light reference. Hence, the XYZ values of a colorimetric light reference are converted into data on the color appearance space JCH using the color appearance model based on the white point of the D50 light source (in case of the D50 reference), the illuminance level, the state of surrounding light, and the like as the calorimetric conditions. Then, the converted values are inversely converted again into XYZ values using the color appearance model based on, e.g., the white point of the D65 light source, the illuminance level, the state of surrounding light, and the like as viewing conditions 2 different from the calorimetric conditions, thus obtaining XYZ values of the ambient light reference (S84). In this way, the relationship from device CMYK values to XYZ values of the ambient light reference is obtained. Next, the gamut of the output device on the JCH or QMH color space is calculated based on the CMYK to ambient light XYZ relationship data obtained in step S84 (S85).

Figure 6:
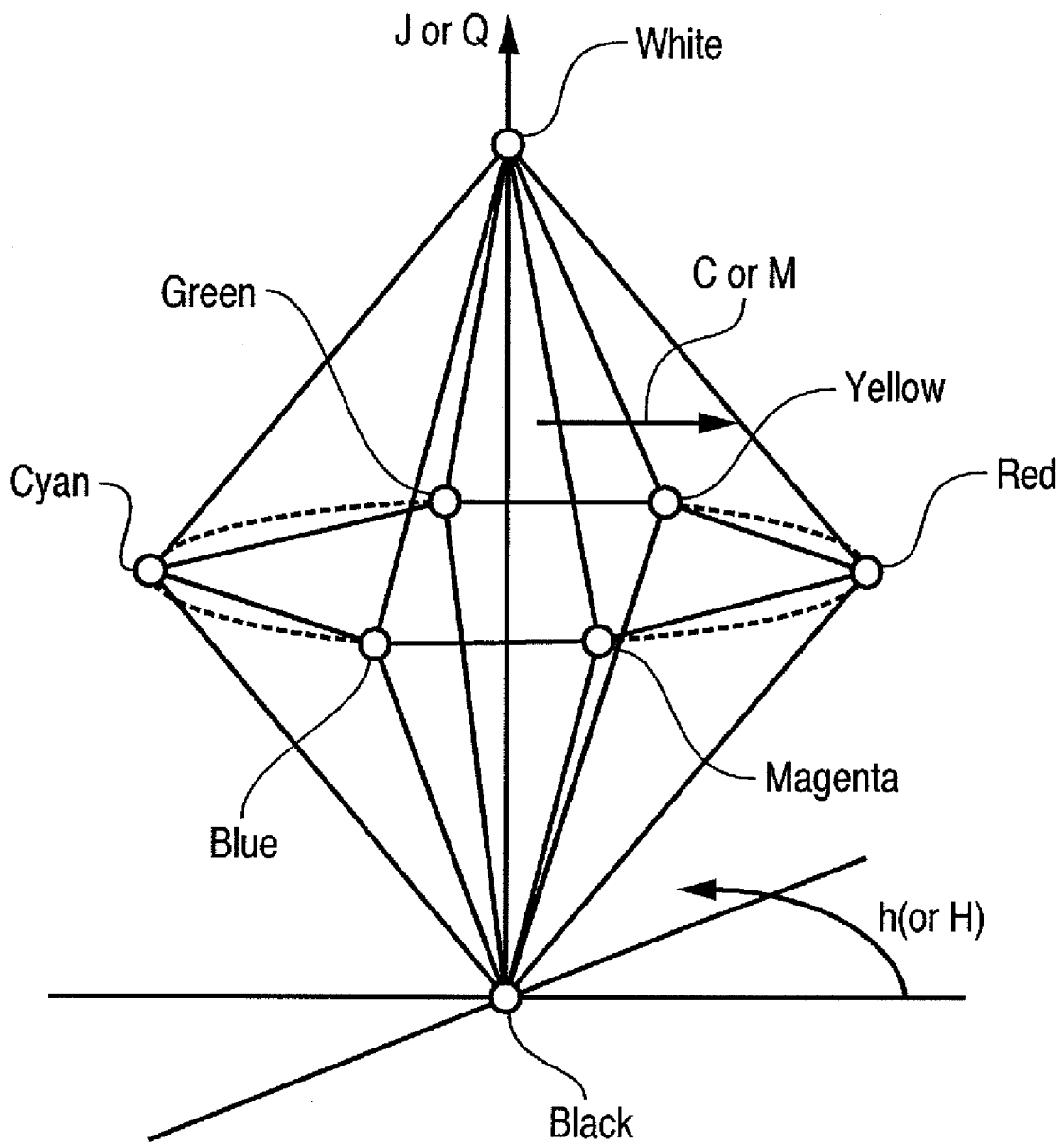
FIG. 6 shows a dodecahedron that approximates the gamut of an output device on the JCH or QMH color space.

The gamut of the output device on the JCH or QMH color space is obtained by calculating, e.g., the XYZ values of the ambient light reference corresponding to the following eight points using the CMYK to ambient light XYZ relationship data obtained in step S84. Furthermore, by converting these XYZ values into coordinate values on the color appearance space JCH or QMH based on viewing conditions 2 using the color appearance model, the gamut of the output device can be approximated by a dodecahedron shown in FIG. 6.

| | |
|---|---|
| Red | (C: 0%, M: 100%, Y: 100%, K: 0%) |
| Yellow | (C: 0%, M: 0%, Y: 100%, K: 0%) |
| Green | (C: 100%, M: 0%, Y: 100%, K: 0%) |
| Cyan | (C: 100%, M: 0%, Y: 0%, K: 0%) |
| Blue | (C: 100%, M: 100%, Y: 0%, K: 0%) |
| Magenta | (C: 0%, M: 100%, Y: 0%, K: 0%) |
| White | (C: 0%, M: 0%, Y: 0%, K: 0%) |
| Black | (C: 0%, M: 0%, Y: 0%, K: 100%) |

In the gamut approximated by the dodecahedron, if a point inside the gamut, i.e., an intermediate point between White and Black on the achromatic color axis and a point (JCH values or QMH values) of an input color signal which is to undergo inside/outside determination are located on the same side, it is determined that the input color signal falls inside the gamut. If these points are located on the opposite sides, it is determined that the input color signal falls outside the gamut. Based on the result of the color gamut inside/outside determination in step S85, gamut mapping is executed (S86).

Figure 7A:
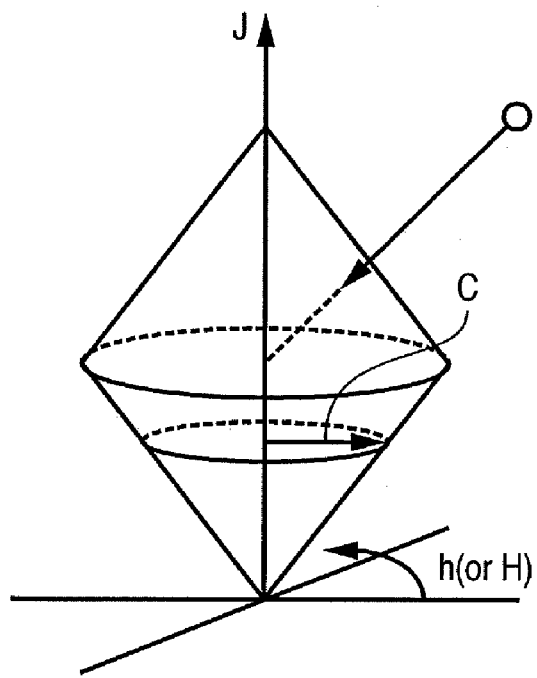
FIGS. 7A and 7B show the concept of gamut mapping on the JCH color appearance space.
Figure 7B:
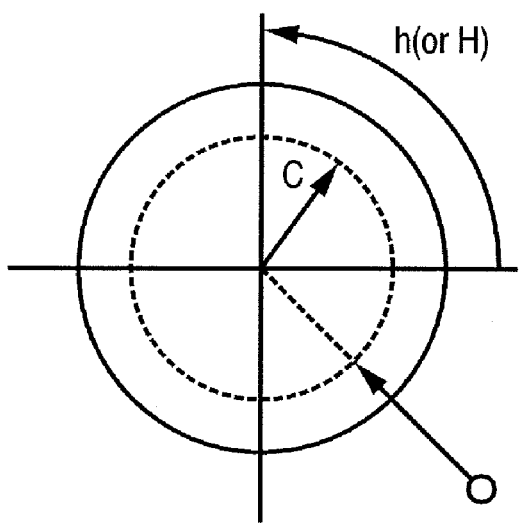
Figure 8A:
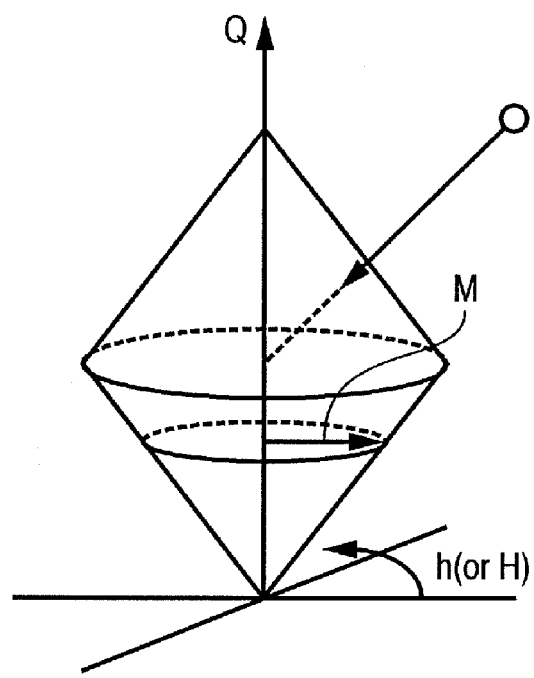
FIGS. 8A and 8B show the concept of gamut mapping on the QMH color appearance space.
Figure 8B:
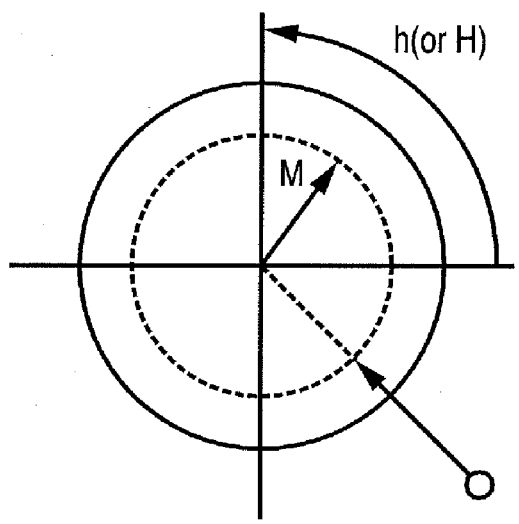

FIGS. 7A and 7B show the concept of gamut mapping on the JCH color appearance space. FIGS. 8A and 8B show the concept of gamut mapping on the QMH color appearance space.

An input color signal which is determined by the inside/outside determination to fall outside the gamut of the output device is mapped inside the gamut to preserve a hue angle h (or H) on the JCH or QMH color space. This mapping result is stored in an LUT which has the JCH color appearance space as input and output color spaces in case of relative color matching, or in an LUT which has the QMH color appearance space as input and output color spaces in case of absolute color matching. Alternatively, the mapping result is incorporated in a program module which comprises a conversion matrix or algorithm used to perform gamut mapping.

Figure 9A:
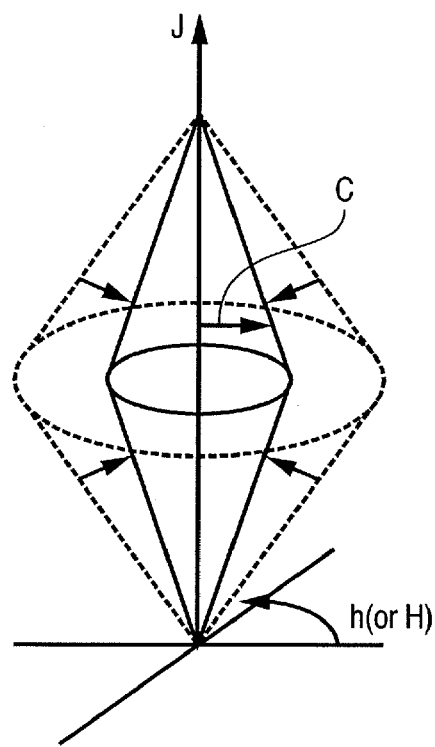
FIGS. 9A and 9B show the concept of gamut mapping between different devices.
Figure 9B:
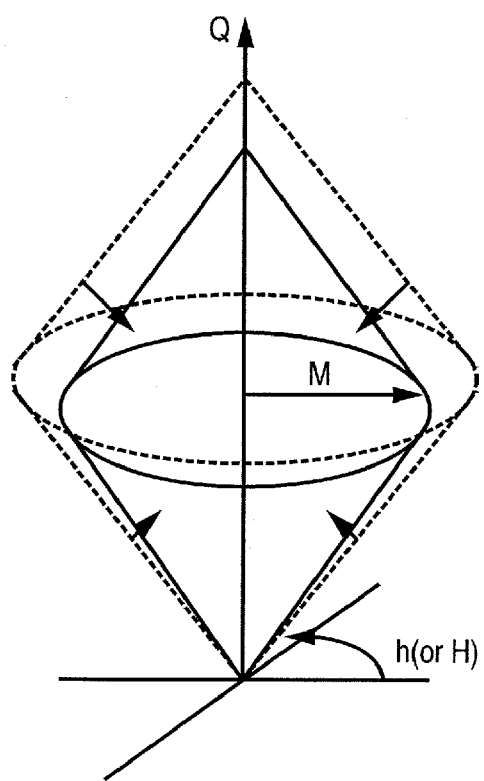

FIGS. 9A and 9B show the concept of gamut mapping between different devices. In FIGS. 9A and 9B, the broken line represents the gamut of an input device, and the solid line represents that of an output device.

On the JCH color space, the level of J (lightness) is normalized based on the light source white points of viewing conditions 1 and 2 (to be abbreviated as "white point 1" and "white point 2" hereinafter in some cases), respectively. Therefore, J does not depend on the illuminance levels of viewing conditions 1 and 2 (to be abbreviated as "illuminance level 1" and "illuminance level 2" hereinafter in some cases). On the other hand, on the QMH color space, the level of Q (brightness) changes depending on illuminance level 1 and illuminance level 2.

That is, in relative color matching using the JCH color space, white point 1 becomes white point 2 intact. On the other hand, in absolute color matching using the QMH color space, if illuminance level 1>illuminance level 2, white point 1 is mapped on white point 2. On the other hand, if illuminance level 1<illuminance level 2, white point 1 is output as gray since it is lower than white point 2.

Creation and Caching of Conversion LUT

Figure 10:
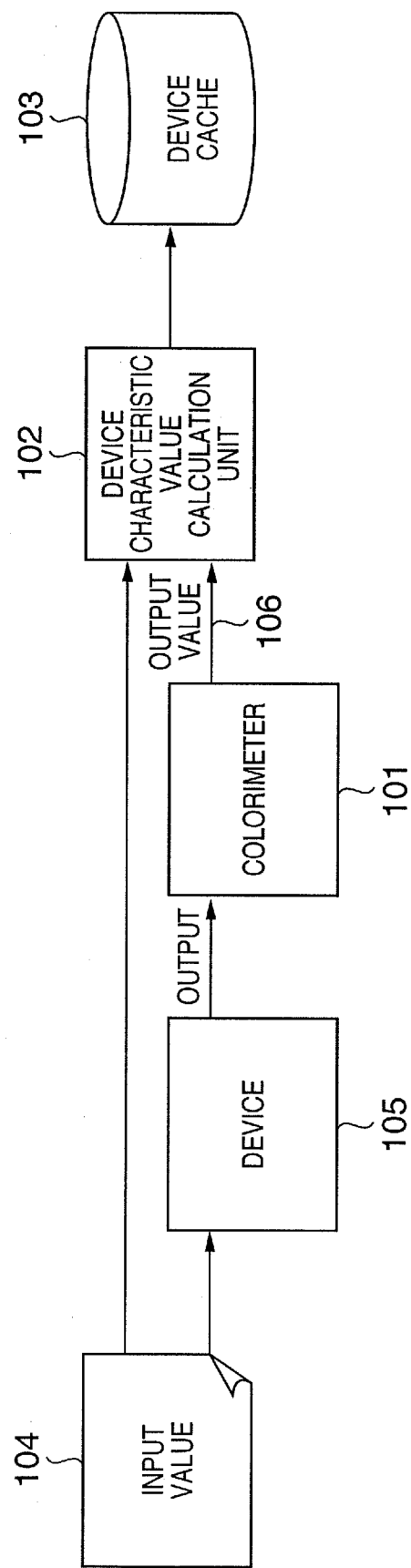
FIG. 10 is a diagram for explaining the sequence for creating a conversion LUT of an output device.

FIG. 10 is a diagram for explaining the sequence for creating the conversion LUT 16 of the output device.

An input value 104 such as RGB, CMYK, or the like, which corresponds to the Lab value of each grid obtained by evenly dividing, e.g., an Lab color space is input to a device 105 (monitor and CMYK printer). A color output from the device 105 is measured by a calorimeter 101 to obtain a calorimetric value (Lab value) 106 of the device corresponding to the input Lab value. In this manner, data indicating correspondence between the input Lab value and output Lab value, i.e., the color reproduction characteristic of the device 105, is obtained. A device characteristic value calculation unit 102 calculates color conversion data for each device, e.g., a gamma value of the monitor or an LUT of the CMYK printer. The color conversion data obtained in this way is saved in a memory. Such color conversion data which is created for each device and is saved in a memory will be referred to as a "device cache" 103 hereinafter. Upon execution of color conversion of the device 105 corresponding to the created device cache 103, the color conversion data creation processing shown in FIG. 10 need not be repeated.

For example, the conversion LUT 11 of an input device such as a scanner, digital camera, or the like can also be calculated from the correspondence between data indicating the color reproduction characteristic of the device and colorimetric data.

In the embodiments to be described hereinafter, device caches include color conversion data of input devices such as a scanner, digital camera, and the like.

The method of creating color conversion data based on the colorimetric values of the device is not limited to that shown in FIG. 10, and other known methods may be used.

As described above, the processing for creating the conversion LUT is complicated. Therefore, by utilizing the device cache, the processing efficiency of color matching can be improved.

Figure 11:
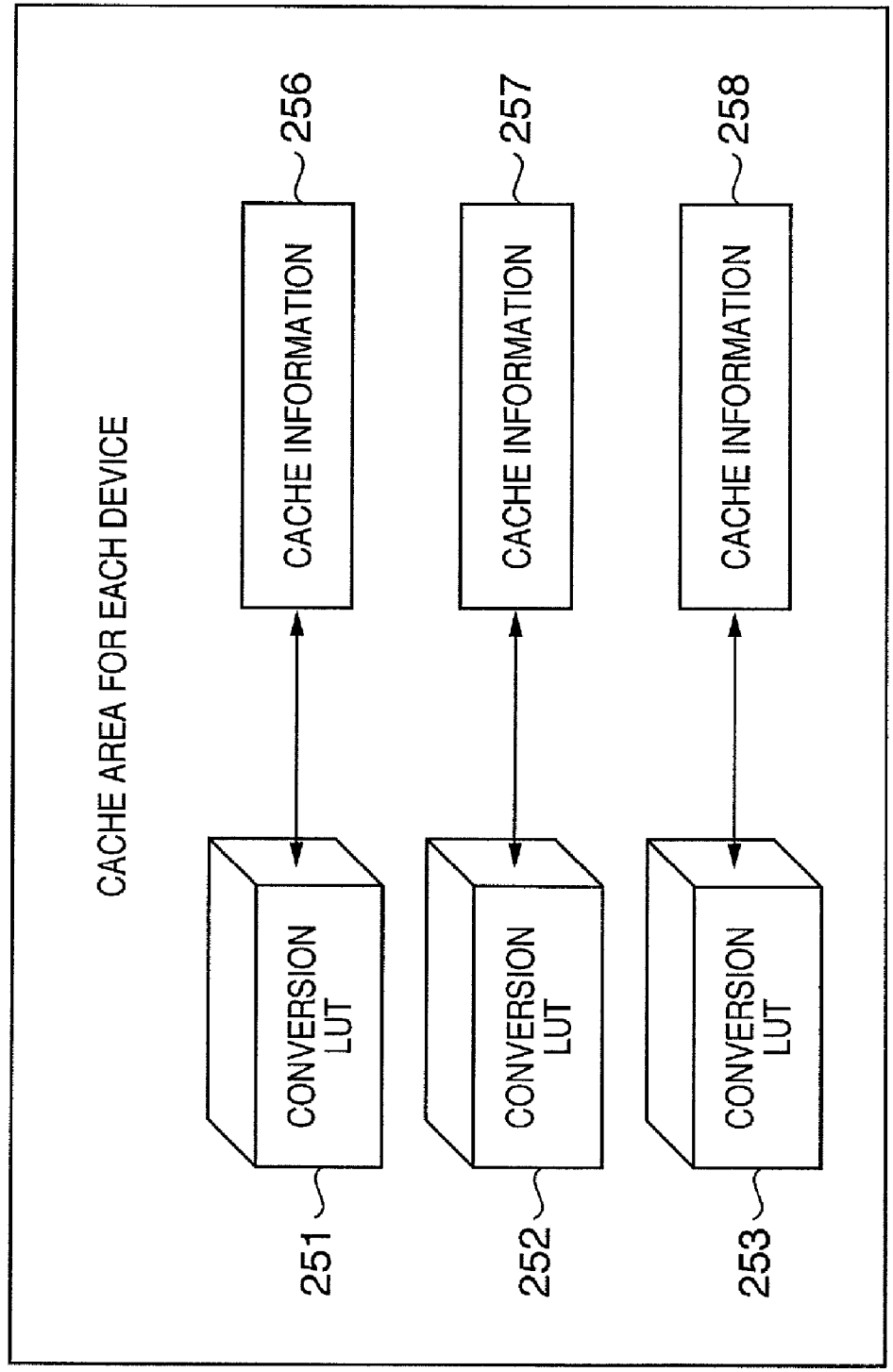
FIG. 11 is a diagram showing a device cache management method.

FIG. 11 shows the device cache management method.

FIG. 11 shows a state in which pairs of caches 251, 252, and 253 of a plurality of conversion LUTs used to mutually convert a device-independent space and a device-dependent space, and three pieces of cache information 256, 257, and 258 of these caches are stored for respective devices. The three pieces of cache information 256, 257, and 258 record generation conditions such as the dates of generation of the caches, viewing conditions, and the like.

The processes of the forward color appearance converter 12 and inverse color appearance converter 15 are also complicated. The processes of the forward converter 12 and inverse converter 15 are those corresponding to the viewing conditions. Therefore, by caching the conversion LUTs in correspondence with the viewing conditions, color matching processing efficiency can be improved.

Caches corresponding to respective processes associated with the color matching processing will be referred to as "partial caches" hereinafter.

System Cache

As shown in FIG. 3, in the relative color matching processing, the conversion LUT 11 converts an input signal into an XYZ signal, and the forward converter 134 converts the XYZ signal into a JCH color space signal. The gamut mapping module 132 maps the JCH color space signal onto the gamut of the output device, and the inverse converter 136 converts the mapped JCH color space signal into an XYZ signal. The conversion LUT 16 converts the XYZ signal into a signal on the color space of the output device.

Every time color matching is executed, it takes time to sequentially execute a plurality of conversion and mapping processes. Hence, upon executing color matching in which, for example, the input and output devices and conditions such as viewing conditions and the like are determined, a conversion LUT that combines a series of processes is cached, thus speeding up the processing.

Figure 12:
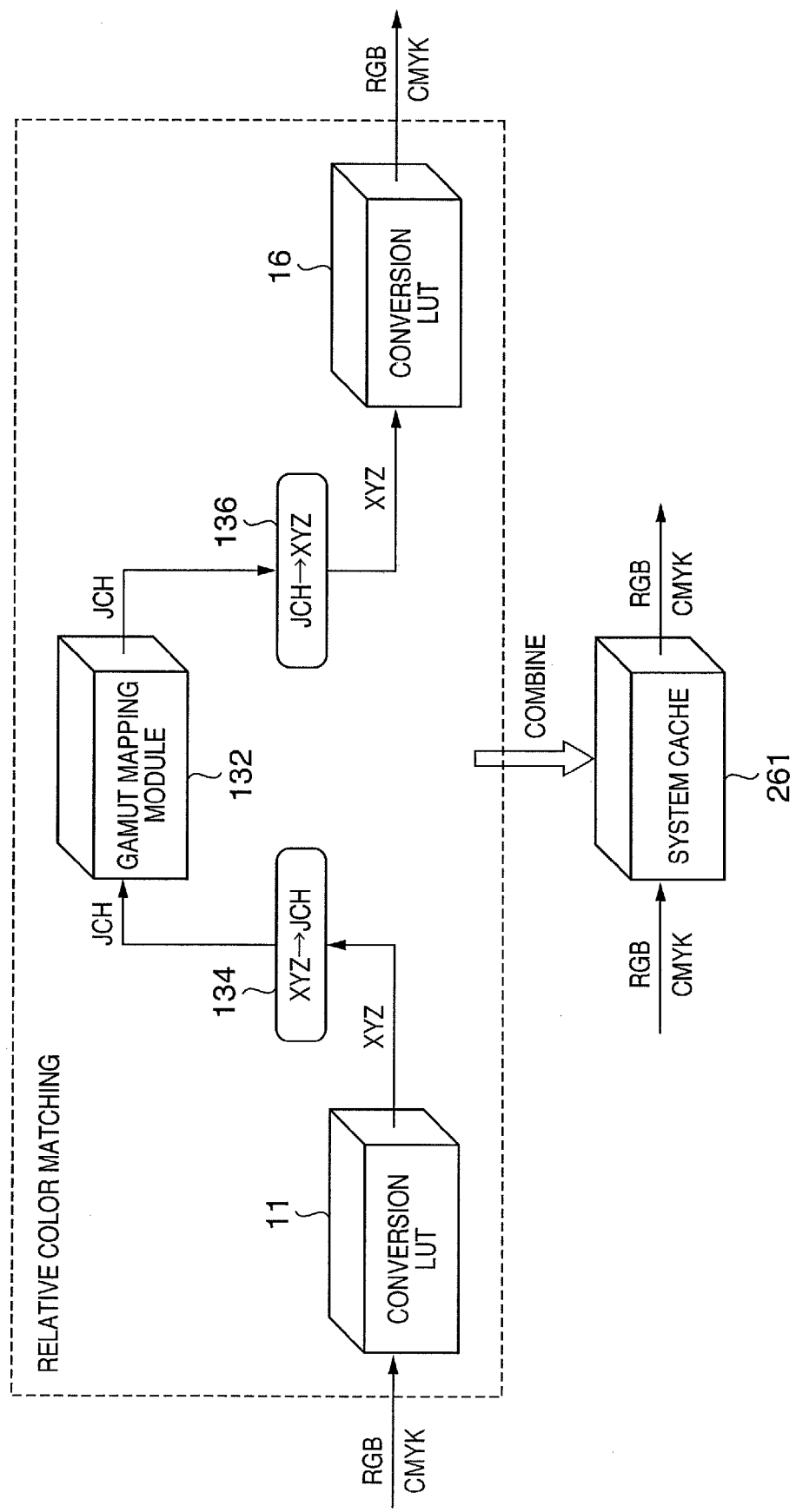
FIG. 12 is a conceptual diagram showing a state in which relative color matching shown in FIG. 3 is combined in a cache as one conversion LUT.

FIG. 12 is a conceptual diagram showing a state in which relative color matching shown in FIG. 3 is combined in a cache 261 as one conversion LUT. This cache 261 will be referred to as a "system cache" hereinafter. The system cache 261 is managed in correspondence with the input and output conversion conditions, the input and output viewing conditions, and the gamut mapping conditions.

First Embodiment

[Functional Arrangement]

Figure 13:
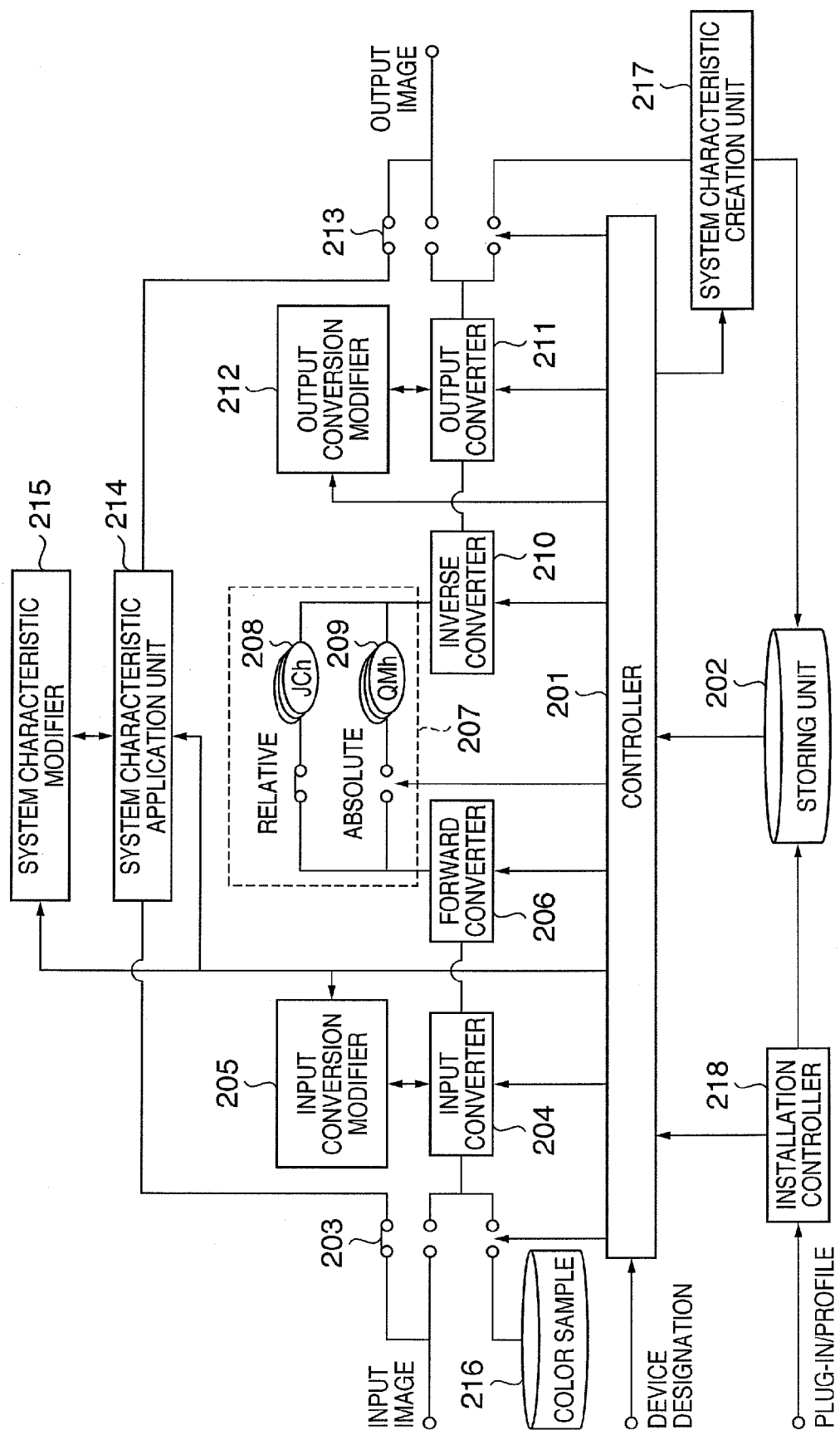
FIG. 13 is a block diagram showing the functional arrangement of an image processing apparatus according to the first embodiment.

FIG. 13 is a block diagram showing the functional arrangement of an image processing apparatus according to the first embodiment. This functional arrangement is implemented when a CPU of a controller 201 executes programs stored in a storing unit 202 such as a hard disk or the like.

The functional arrangement shown in FIG. 13 can be roughly classified into an input converter 204, forward converter 206, inverse converter 210, gamut mapping unit 207, and output converter 211. An input image is converted into an output image via these functional units.

The input converter 204 and output converter 211 convert an input image using information which stores the corresponding color signal values of some representative colors called color samples 216 and their colorimetric values. In order to improve the conversion speed, LUTs (cache data) as individual conversion characteristic data generated based on parameters to be given to conversion models and values before and after conversion are stored as device caches in the storing unit 202.

In order to further improve the conversion speed, an LUT as conversion characteristic data obtained by integrating the inputs and outputs of all of the input converter 204, output converter 211, forward converter 206, inverse converter 210, and gamut mapping unit 207 is stored as a system cache in the storing unit 202. A system characteristic application unit 214 executes color conversion by reading out this system cache.

In general, since an output device such as a printer or the like suffers color variations due to changes in temperature, humidity, and the like, its device cache must be periodically updated. Also, the system cache must be re-created every time components such as input and output devices, GMAs, and the like of a color matching workflow have changed. It is inefficient and it takes long processing time to generate cache data from the beginning every time the device caches and system cache are updated, since data which need not be updated must also be re-calculated. Hence, the existing cache data is modified. That is, the device caches corresponding to the input converter 204 and output converter 211 are modified by an input conversion modifier 205 and output conversion modifier 212. Also, the system cache corresponding to the system characteristic application unit 214 is modified by a system characteristic modifier 215.

[Creation and Modification of Cache Data]

Figure 14:
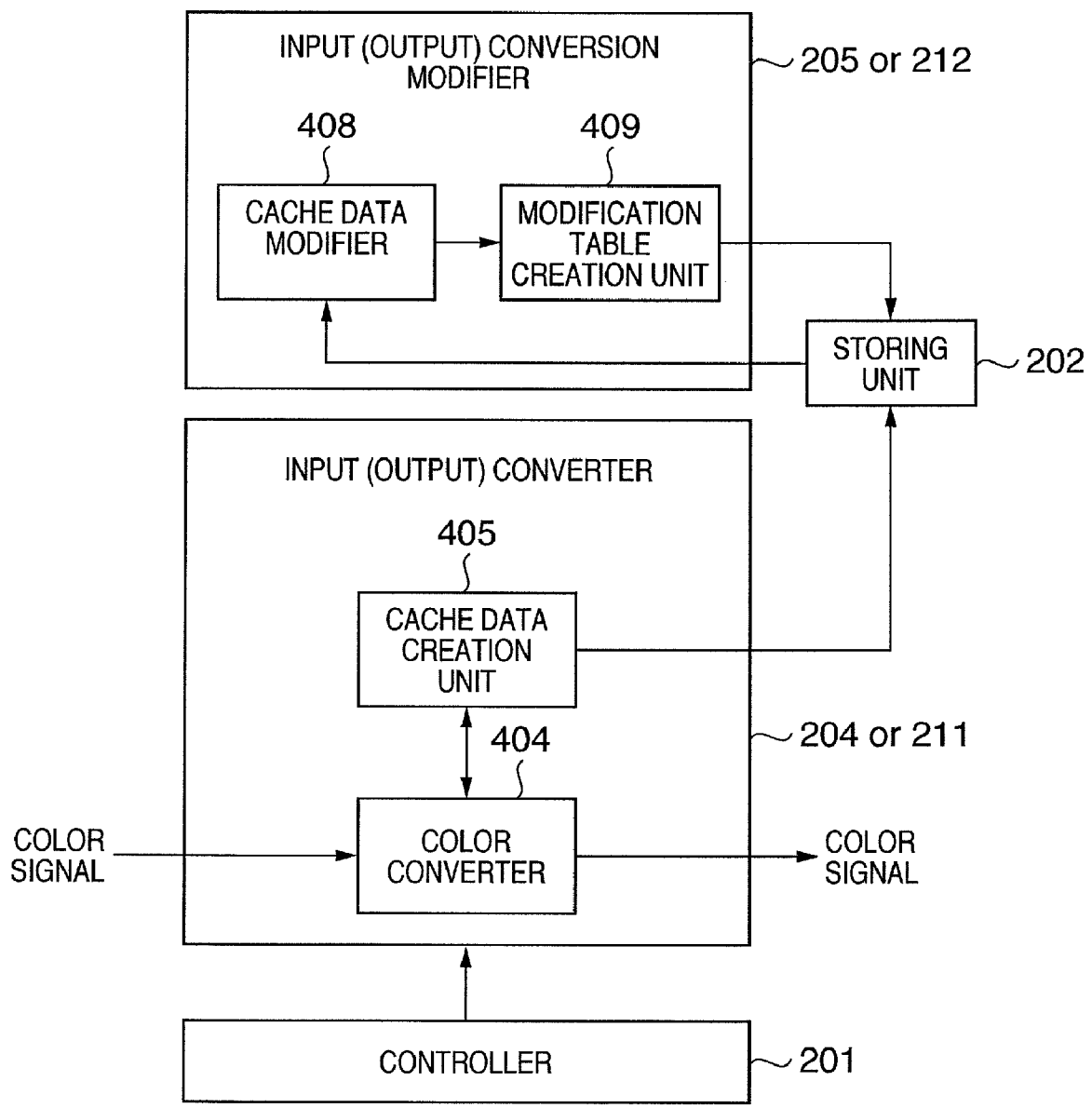
FIG. 14 is a diagram showing the relationship between an input converter or output converter, and an input conversion modifier or output conversion modifier.

FIG. 14 shows the relationship among the input converter 204 or output converter 211, the input conversion modifier 205 or output conversion modifier 212, and the storing unit 202.

The input converter 204 converts an input device-dependent color signal into a device-independent color signal using a color signal converter 404 and outputs the device-independent color signal. The output converter 211 converts an input device-independent color signal into a device-dependent color signal using the color signal converter 404, and outputs the device-dependent color signal. Upon reception of the color samples 216 from the controller 201, the color signal converter 404 passes conversion parameters or conversion table information to a cache data creation unit 405. The cache data creation unit 405 creates cache data as individual conversion characteristic data based on the received information, and saves it in the storing unit 202 (as a device cache). Subsequently, the color signal converter 404 performs normal conversion or performs conversion by reading out the device cache from the storing unit 202.

In order to change the color of an output image with respect to an input image in the image processing apparatus of this embodiment, modules and cache data of the input converter 204, output converter 211, forward converter 206, inverse converter 210, and gamut mapping unit 207 are replaced. Such method can change the color but does not suffice to adjust local color. Hence, the color is modified by the input conversion modifier 205, output conversion modifier 212, and system characteristic modifier 215.

The input conversion modifier 205 and output conversion modifier 212 modify cache data of device caches read out from the storing unit 202 by a cache data modifier 408. A modification table creation unit 409 creates a modification table (cache data) based on the modification result, and saves it in the storing unit 202 (as a device cache).

The same applies to the system characteristic application unit 214. The controller 201 passes the conversion parameters or conversion table information of the color matching workflow to the system characteristic creation unit 217. The system characteristic creation unit 217 creates cache data as integrated conversion characteristic data based on the received information, and saves it in the storing unit 202 (as a system cache). Subsequently, the system characteristic application unit 214 reads out the system cache from the storing unit 202, and executes conversion. The system characteristic modifier 215 modifies cache data of the system cache read out from the storing unit 202, creates a modification table (cache data) based on the modification result, and saves it in the storing unit 202 (as a system cache).

Note that an installation controller 218 updates control tables, which are stored in the storing unit 202 and are used to manage the device caches and system cache, by storing plug-ins and profiles (to be described later) in the storing unit 202.

Figure 15:
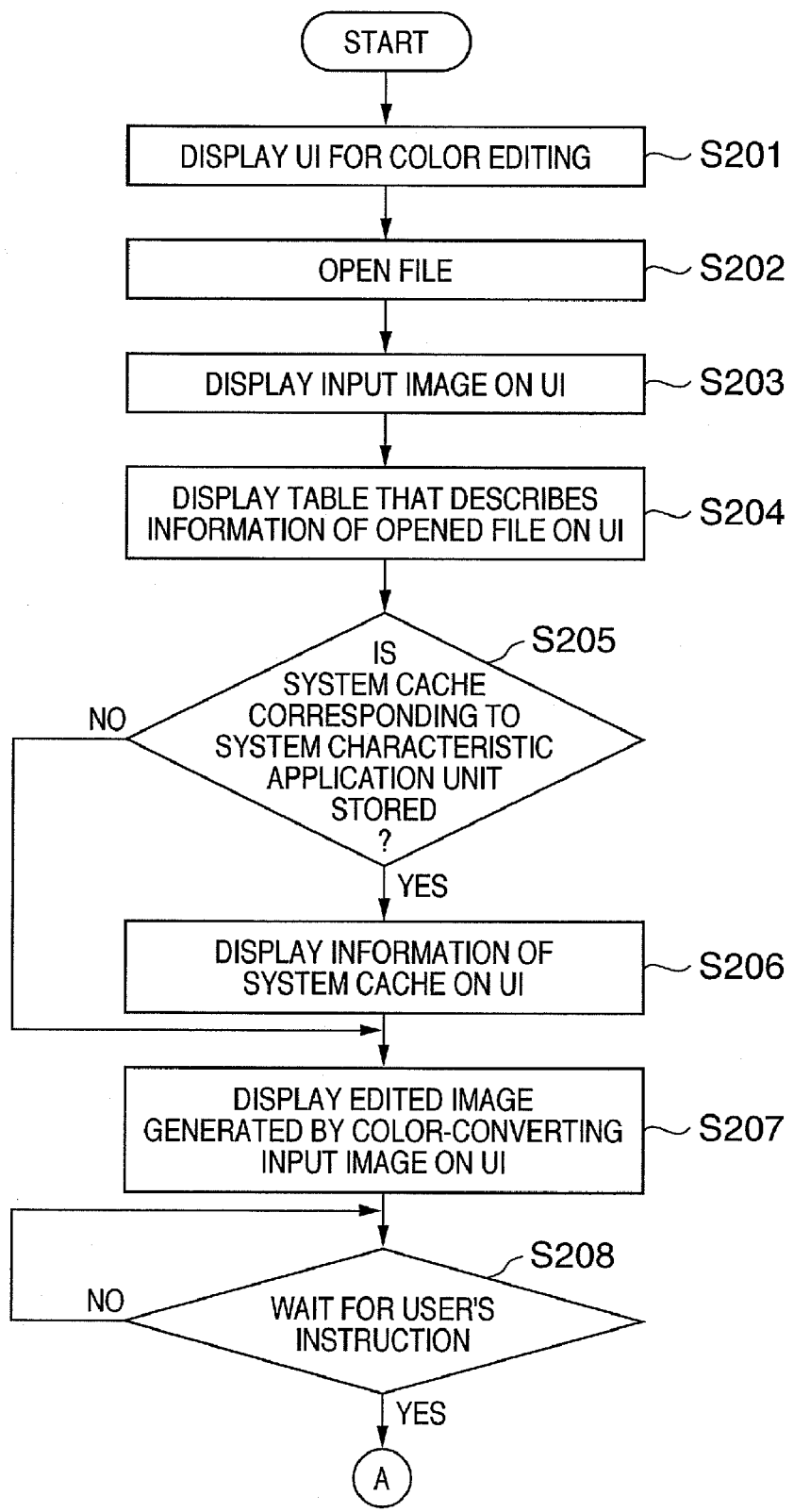
FIGS. 15 and 16 are flowcharts showing modification processing of cache data as individual and integrated conversion characteristic data.
Figure 16:
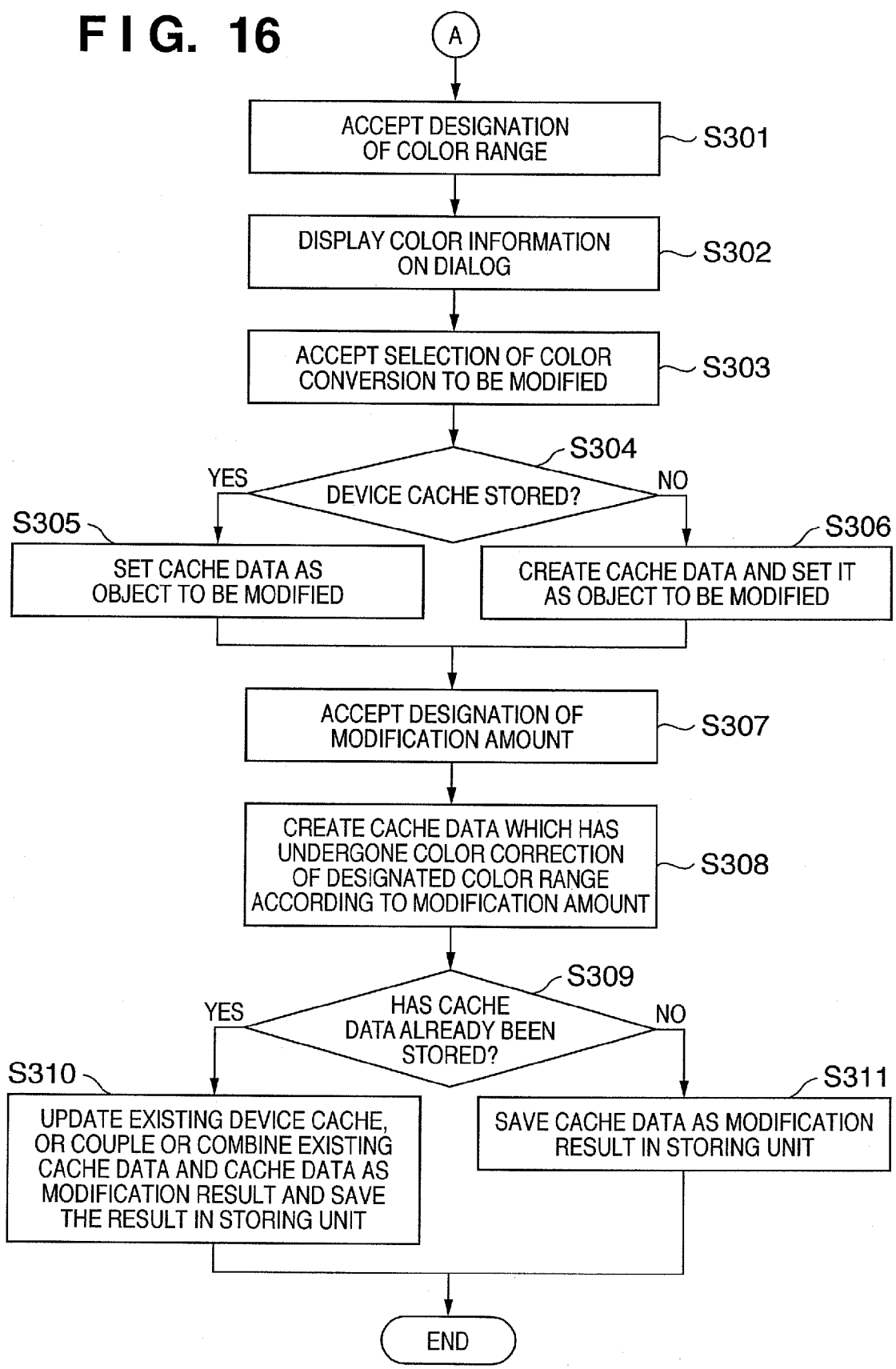

FIGS. 15 and 16 are flowcharts showing the modification processing of cache data as individual and integrated conversion characteristic data. This processing is executed by the controller 201.

Figure 17:
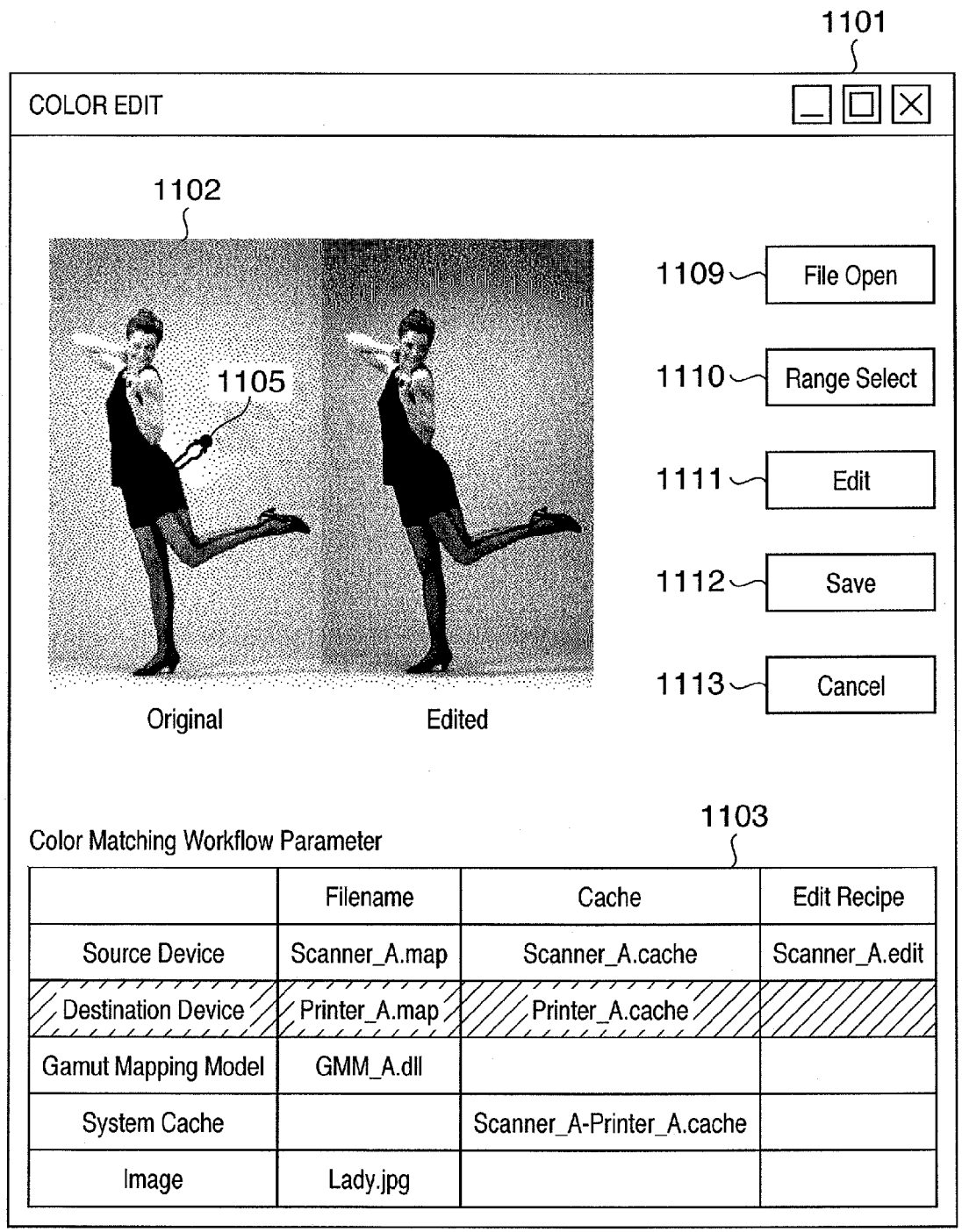
FIG. 17 shows an example of a user interface for color editing.
Figure 18:
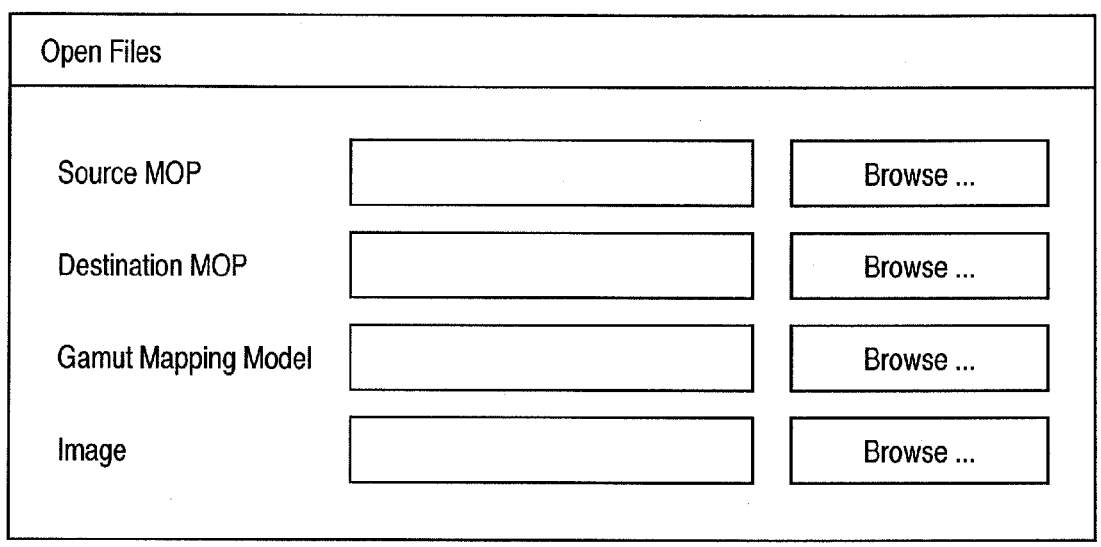
FIG. 18 shows an example of a file open dialog.

When the modules of the cache data modifier 408 and system characteristic modifier 215 are called, the controller 201 displays a user interface (UI) 1101 for color editing shown in FIG. 17 on a monitor (S201). When the user presses a File Open button 1109 on the UI, the controller 201 displays a dialog shown in FIG. 18 to read various data as parameters to be passed to the modification modules, and opens files designated by the user (S202). The files to be opened include input colorimetric information (Source MOP), output calorimetric information (Destination MOP), a gamut mapping module (Gamut Mapping Model), an input image (Image), and the like. Note that "MOP" is an abbreviation for "measurement only profile": Source MOP indicates the color reproduction characteristic of a source device, and Destination MOP indicates that of a destination device.

Next, the controller 201 displays, on the UI 1101, an input image 1102 (S203), and also a table 1103 that describes information of the opened files (S204). Of the input files, the input colorimetric information and output colorimetric information may often describe information indicating cache information and cache modification information, and these pieces of information are also displayed on the table 1103.

The controller 201 then checks if a system cache corresponding to the system characteristic application unit 214 is saved (S205). If such system cache is saved, the controller 201 displays its information in a System Cache line of the table 1103 (S206).

The controller 201 displays a converted image, which is obtained by applying color conversion to the input image 1102 according to the color matching workflow which is set in this way, as an edited image on the UI 1101 next to the input image 1102 (S207). The controller 201 then transits to a waiting state for the next user's instruction (S208).

Figure 19:
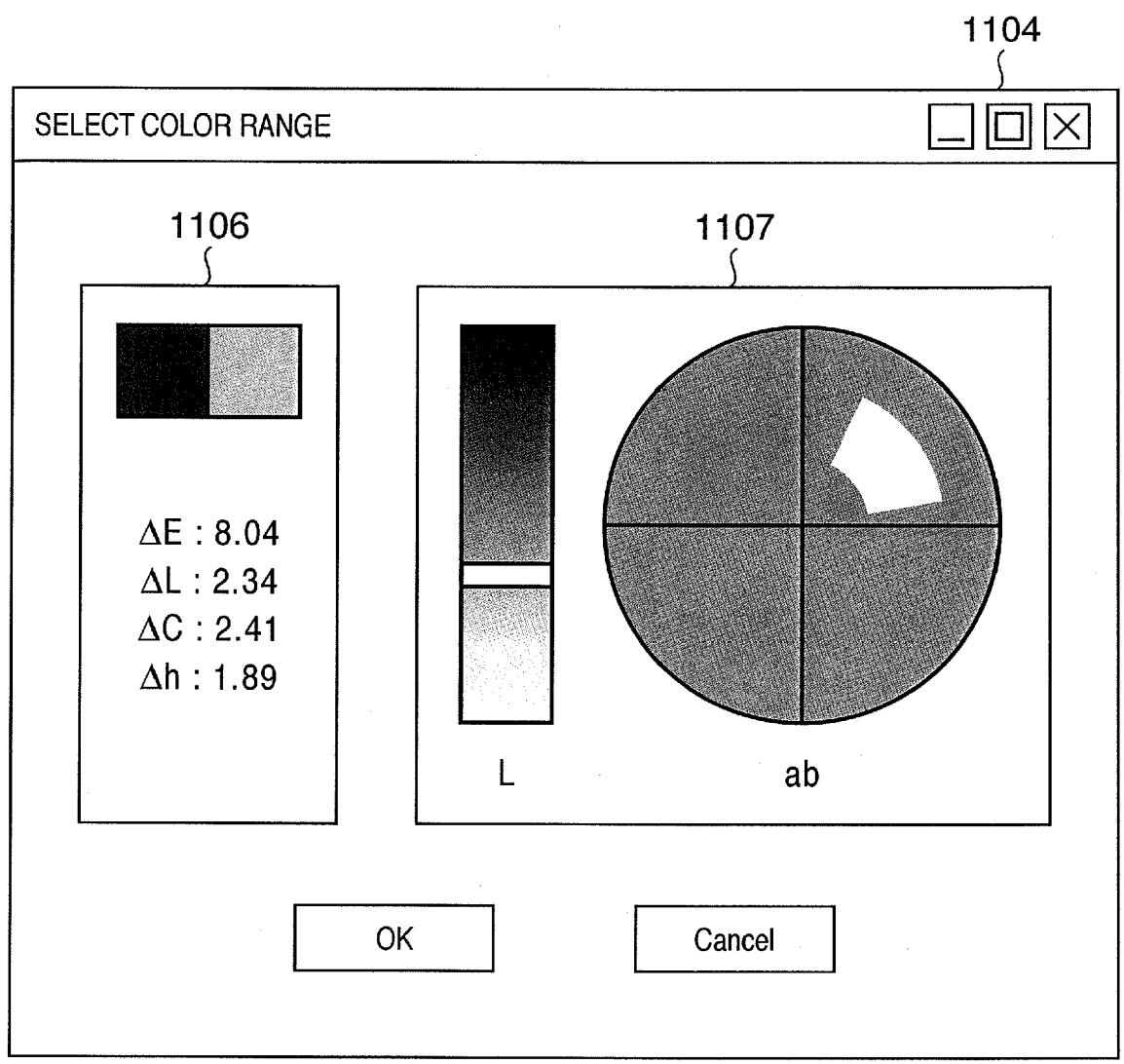
FIG. 19 shows an example of a color range setting dialog.

When the user presses a Range Select button 1110 on the UI 1101, the controller 201 displays a dropper icon 1105 shown in FIG. 17 and also a dialog 1104 used to set the color range shown in FIG. 19, and accepts user's designation of the color range (S301). The controller 201 calculates information of the color of the input image designated by the dropper icon 1105 and that of an output image at the same coordinate position as that on the input image designated by the dropper icon 1105, and displays them on a window 1106 of the dialog 1104 (S302). Note that FIG. 19 exemplifies a case that displays ΔE (color difference), ΔL (lightness difference), ΔC (saturation difference), and Δh (hue difference), but other kinds of information may be displayed. If the user presses an OK button on the dialog 1104, the controller 201 ends acceptance of designation of the color range, and sets the color range.

The controller 201 accepts a user's selection of color conversion to be modified (S303). The user designates the color conversion to be modified by selecting a line of the table 1103 that displays an object to be modified. In response to this user's selection, the controller 201 checks if a device cache of the selected color conversion is saved (S304). If such device cache is saved, the controller 201 selects cache data of the device cache as the object to be modified (S305); otherwise, it creates new cache data and selects it as the object to be modified (S306).

Figure 20:
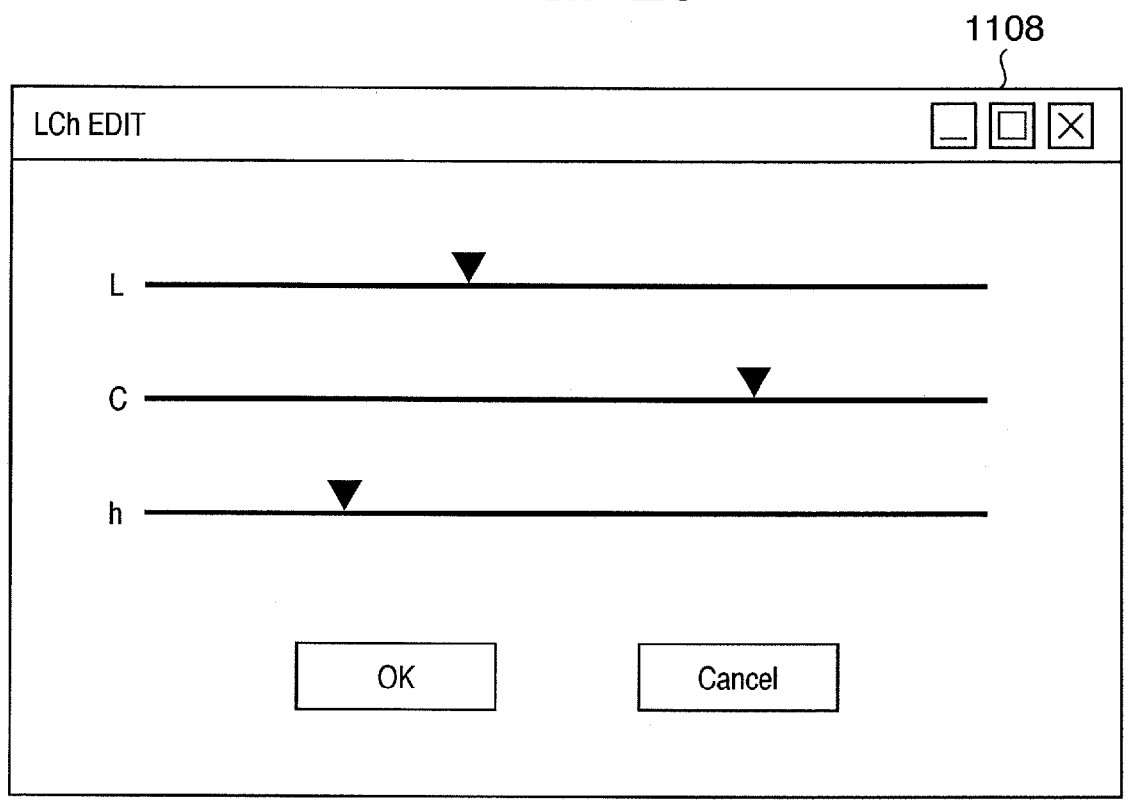
FIG. 20 shows an example of a color modification dialog.

When the user presses an Edit button 1111 on the UI 1101, the controller 201 displays a dialog 1108 for color editing shown in FIG. 20, and accepts modification amounts of L, C, and h (S307). FIG. 20 shows a general LCh editor as a UI used to designate color modification, but other methods may be used.

When the user presses an OK button after he or she designates modification amounts by operating the LCh editor shown in FIG. 20, the controller 201 creates cache data obtained by modifying colors within the designated color range in accordance with the modification amounts (S308). Upon saving the cache data of the modification result in the storing unit 202, the controller 201 checks if the corresponding device cache has already been saved (S309). If no such device cache is saved, the controller 201 describes related information in the cache data and saves the cache data in the storing unit 202 (as a device cache) (S311). If such device cache has already been saved, the controller 201 performs updating of the existing device cache, coupling or combination of the cache data of the existing device cache and that of the modification result, or the like. The controller 201 describes related data in the cache data as the modification result, and saves the cache data in the storing unit 202 (as a device cache) (S310). Upon saving the cache data as the modification result in the storing unit 202 (as a device cache), the controller 201 updates the aforementioned control table that associates the device cache and device information.

[Updating of Conversion LUT]

FIGS. 21A to 21C are views for explaining the relationship between the conversion LUT and color reproduction of printer A. Note that the conversion LUT corresponds to the conversion LUT 16 on the output side shown in FIG. 3.

FIG. 21A shows an initial state in which a conversion LUT 271a for printer A is created. The conversion LUT 271a is ideally adjusted. Therefore, a printout 272a obtained based on color signals output from the conversion LUT 271a shows accurate color reproduction with respect to XYZ signals input to the conversion LUT 271a.

FIG. 21B shows a state in which the ambient conditions (humidity and temperature) of printer A have varied or printer A has deteriorated over time as a result of repetitive prints. A printout 272b shows inaccurate color reproduction with respect to XYZ signals.

In order to obtain accurate color reproduction in the state of printer A whose characteristic has varied shown in FIG. 21B, a conversion LUT corresponding to the viewing conditions on the output side must be re-created. However, upon re-creating the conversion LUT, CMYK to XYZ relationship data of printer A in the state of FIG. 21B must be obtained again. Furthermore, all conversion LUTs associated with printer A must be updated to conversion LUTs 271c, as shown in FIG. 21C by obtaining CMYK to XYZ relationship data every time the characteristic of the printer A has varied.

Figure 22A:
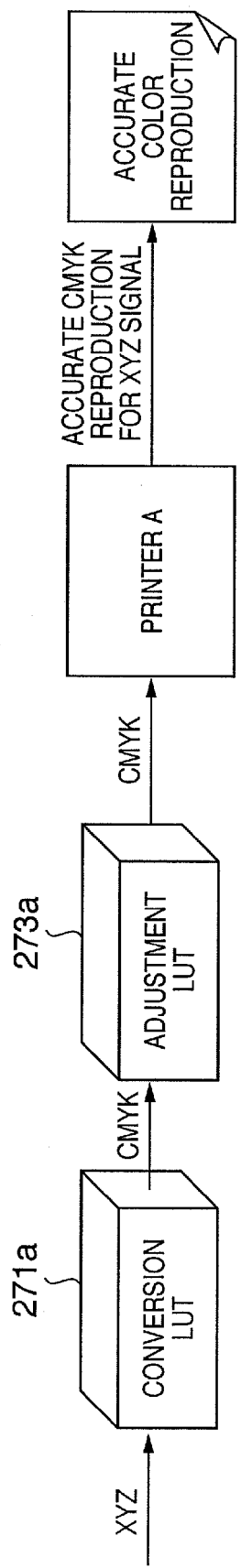
FIGS. 22A and 22B are views for explaining a method of coping with variations of printer characteristics without updating a conversion LUT in an initial state.
Figure 22B:
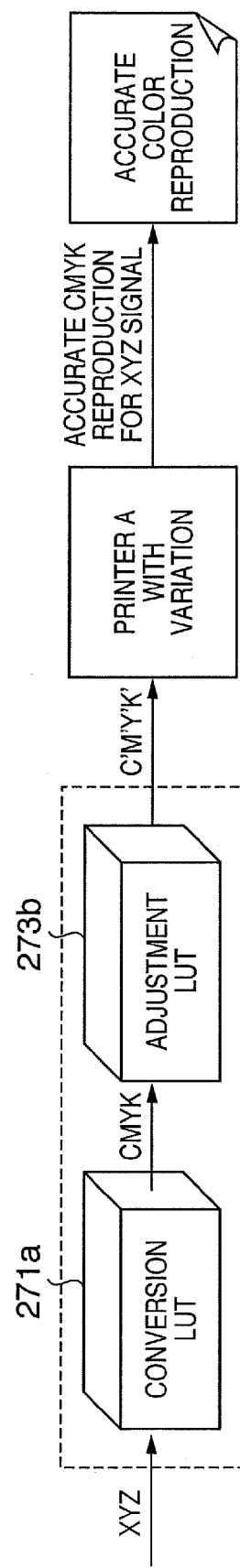

FIGS. 22A and 22B are views for explaining the method of coping with variations of the characteristic of printer A without updating the conversion LUT in the initial state.

As shown in FIG. 22A, an adjustment LUT 273a that converts CMYK signals into CMYK signals is added after the conversion LUT 271a in the initial state. The adjustment LUT 273a in the initial state is an LUT, which directly outputs input signals as output signals, i.e., it does not perform any conversion in practice. When the characteristic of printer A has varied, the adjustment LUT 273a is updated to an adjustment LUT 273b to convert input CMYK signals into C'M'Y'K' signals, as shown in FIG. 22B. That is, the conversion characteristic obtained by integrating the conversion LUT 271a and the adjustment LUT 273b is the same that of the re-created conversion LUT 271c shown in FIG. 21C.

Upon updating the adjustment LUT, for example, the color samples 216 are printed using printer A, and the printout of the color samples is measured. Then, an adjustment that applies color correction to CMYK signals to obtain C'M'Y'K' signals is formed so as to accurately reproduce the colors of the color samples. As in the processing shown in FIG. 16, upon saving the adjustment LUT 273b in the storing unit 202, the cache data of the existing conversion LUT 271a is integrated with the data of the adjustment LUT 273b, and the integrated data is saved in the storing unit 202 (as a device cache) (S310). Of course, all device caches for printer A are updated to conversion characteristic data obtained by integrating the existing conversion LUTs and the adjustment LUT.

As described above, an LUT equivalent to the conversion LUT 271c shown in FIG. 21C can be set as a combination of the conversion LUT 271a and the adjustment LUT 273b. Therefore, color conversion and color correction according to variations of printer A can be implemented without updating the conversion LUT 271a which is created based on the CMYK to XYZ relationship data in the initial state of printer A.

Second Embodiment

Image processing according to the second embodiment will be described below. Note that the same reference numerals in the second embodiment denote the same parts as in the first embodiment, and a detailed description thereof will be omitted.

Figure 23A:
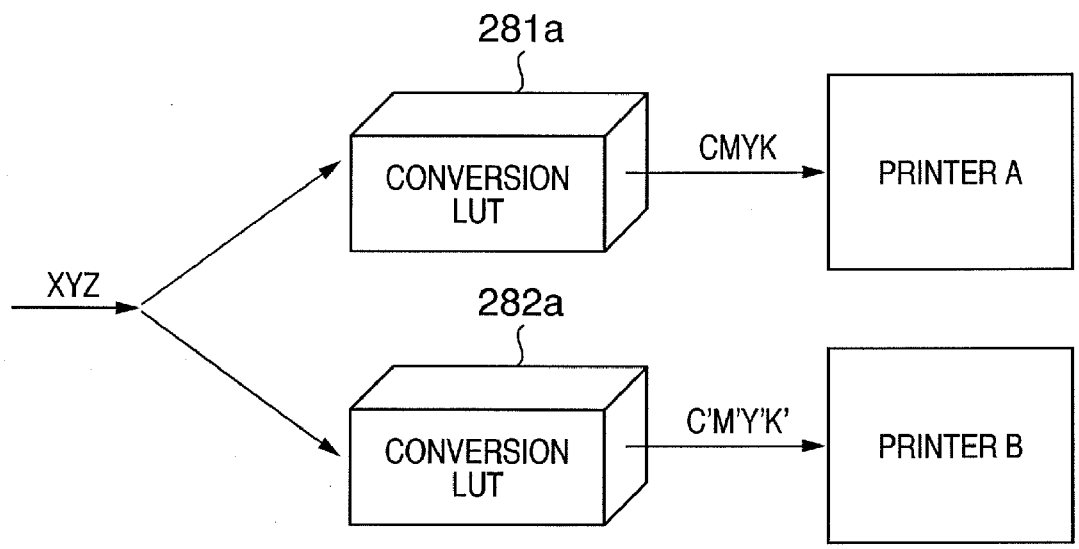
FIGS. 23A and 23B are views of a printing system which obtains identical color reproduction for identical print data or an identical print job under identical viewing conditions using a plurality of printers of different models.
Figure 23B:
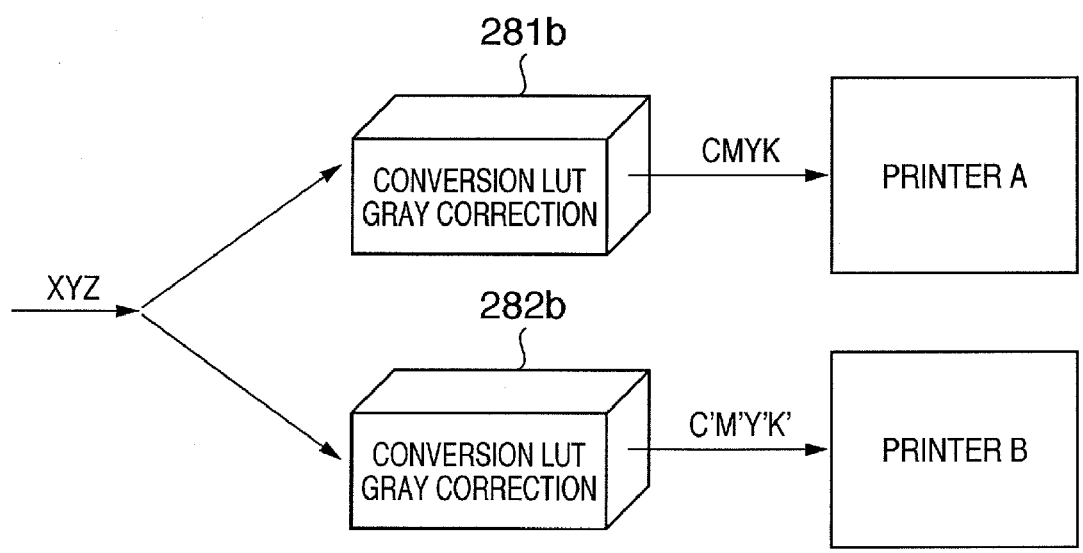

FIGS. 23A and 23B are views showing a printing system which obtains identical color reproduction for identical print data or an identical print job under identical viewing conditions using a plurality of printers of different models.

Referring to FIG. 23A, identical XYZ data are input to conversion LUTs 281a and 282a. However, since printers A and B are of different models, the conversion LUTs 281a and 282a have different conversion characteristics, and color signals output from these conversion LUTs have different values CMYK and C'M'Y'K'.

When gray color is to be changed in this printing system, the conversion LUTs 281a and 282a are updated to conversion LUTs 281b and 282b which have undergone gray correction. In this way, printouts whose gray color is similarly changed can be obtained by printers A and B. However, in order to obtain identical color reproduction between a plurality of printers of different models, the conversion LUTs must be adjusted for respective printers.

Figure 24A:
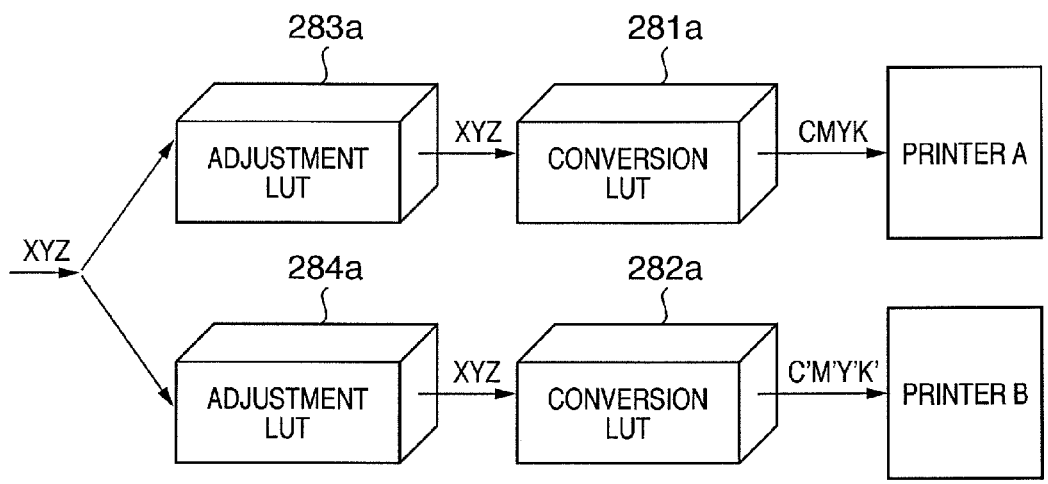
FIGS. 24A and 24B are views for explaining a method of applying gray correction without updating a conversion LUT in an initial state.
Figure 24B:
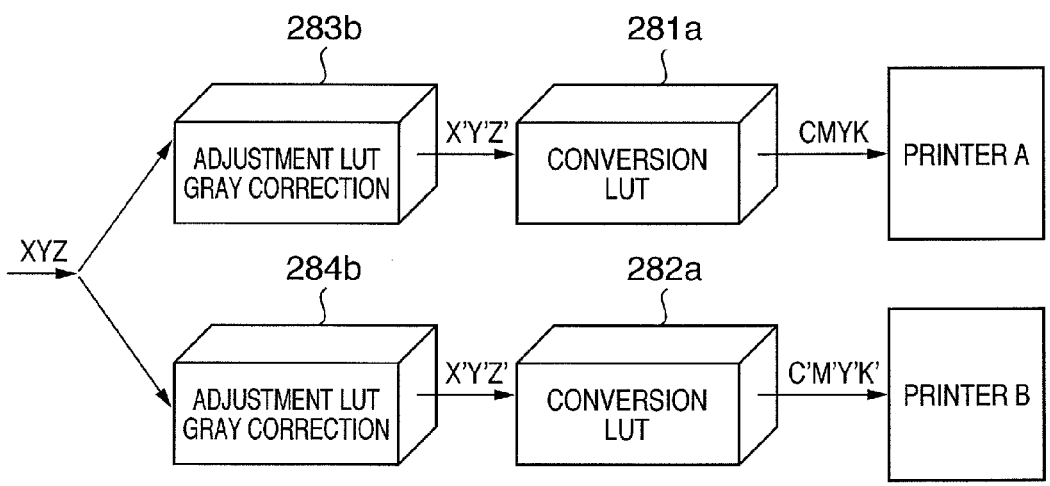

FIGS. 24A and 24B are views for explaining the method of applying gray correction without updating the conversion LUTs in the initial state.

As shown in FIG. 24A, adjustment LUTs 283a and 284a for converting XYZ signals into XYZ signals are added before the conversion LUTs 281a and 282a in the initial state. The adjustment LUTs 283a and 284a in the initial state are LUTs which directly output input signals as output signals, i.e., do not perform any conversion in practice. In case of gray correction, as shown in FIG. 24B, the adjustment LUTs are updated to adjustment LUTs 283b and 284b to convert input XYZ signals into X'Y'Z' signals. That is, the conversion characteristic obtained by integrating the adjustment LUT 283b and the conversion LUT 281a is the same as that of the updated conversion LUT 281b in FIG. 23B. Also, the conversion characteristic obtained by integrating the adjustment LUT 284b and the conversion LUT 282a is the same as that of the updated conversion LUT 282b in FIG. 23B.

Figure 25:
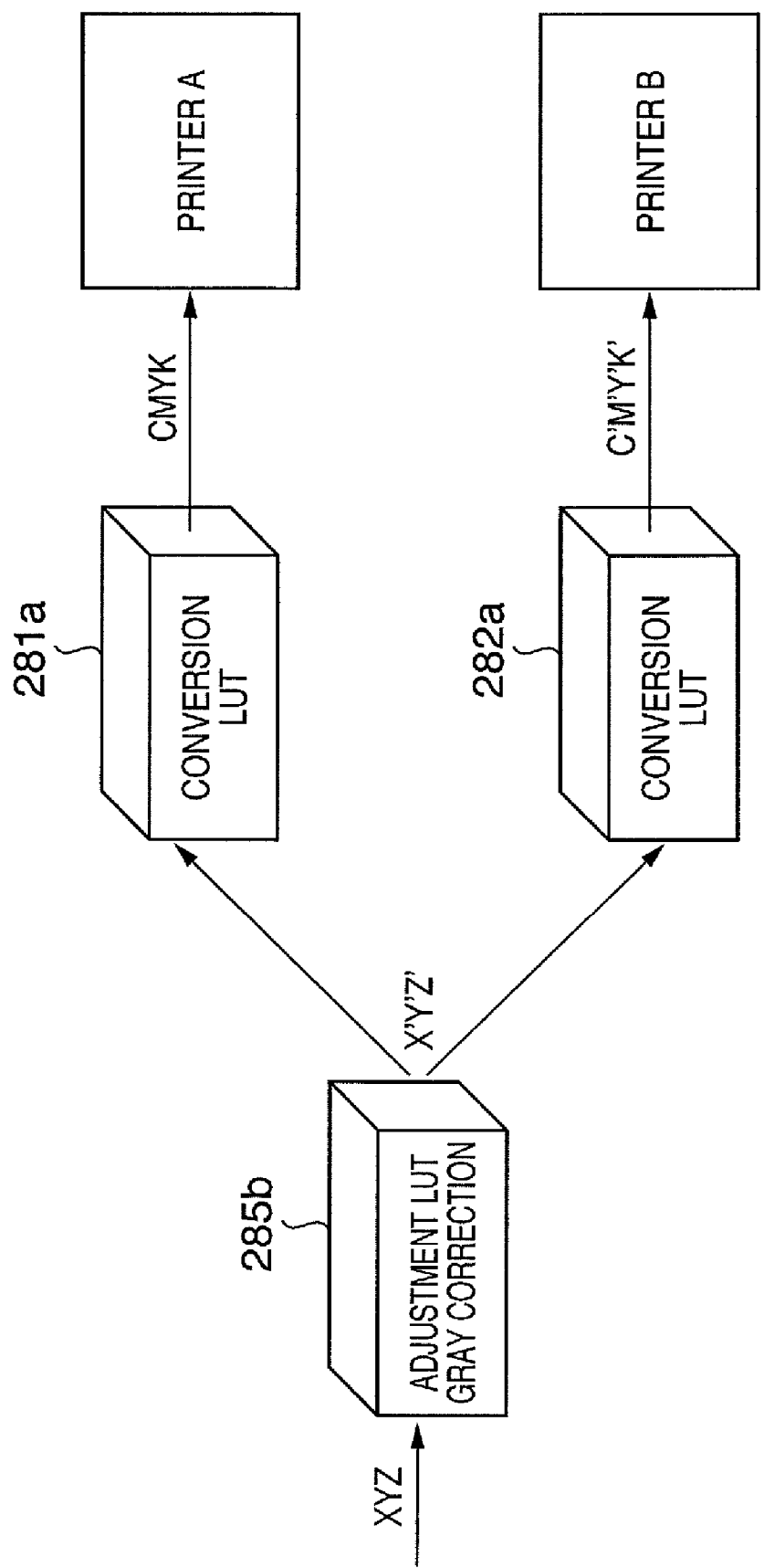
FIG. 25 is a view for explaining use of one adjustment LUT.

Meanwhile, the XYZ signals input to the adjustment LUT are color signals on a device-independent color space. That is, the adjustment LUTs 283b and 284b have the same conversion characteristic, and need not be separately used. Therefore, only one adjustment LUT (adjustment LUT 285b) may be used, and its output may be input to the conversion LUTs 281a and 282a, as shown in FIG. 25.

Since the update method of the adjustment LUT is the same as the method of creating and modifying cache data, and the method of saving the adjustment LUT in the first embodiment, a description thereof will be omitted.

The above description assumes two different models of printers. However, in a clustering printing system using three or more models of printers, the aforementioned adjustment LUT can be applied.

Third Embodiment

Image processing according to the third embodiment will be described below. Note that the same reference numerals in the third embodiment denote the same parts as in the above description, and a detailed description thereof will be omitted.

Figure 26A:
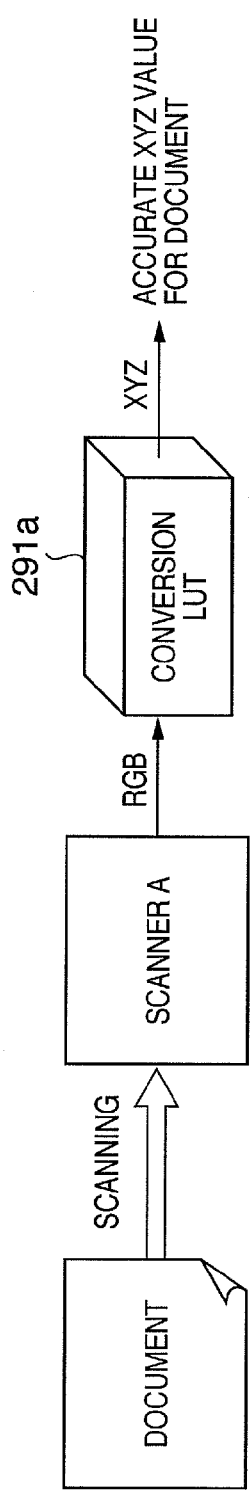
FIGS. 26A to 26C are views for explaining the relationship between the conversion LUTs and color reproduction of a scanner according to the third embodiment.
Figure 26B:
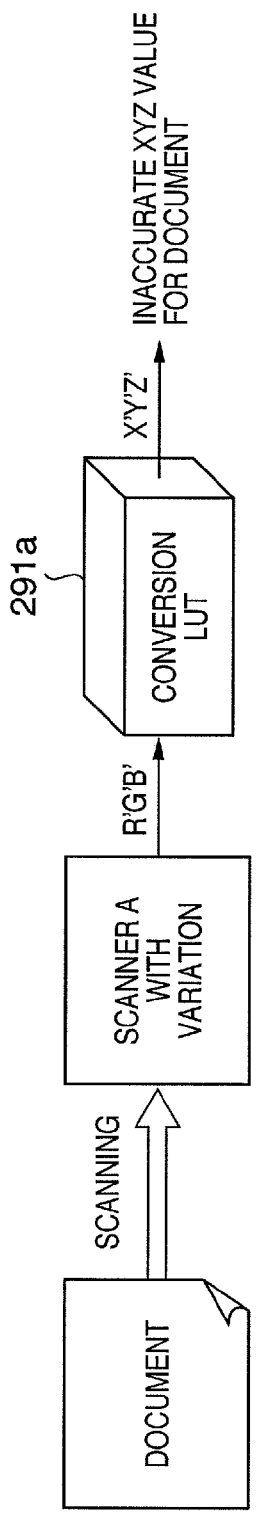
Figure 26C:
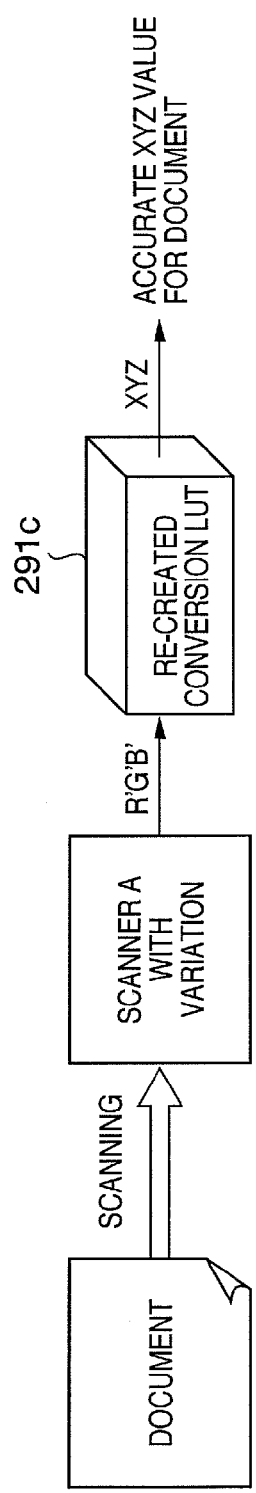

FIGS. 26A to 26C are views for explaining the conversion LUT and color reproduction of scanner A. Note that the conversion LUT corresponds to the conversion LUT 11 on the input side shown in FIG. 3.

FIG. 26A shows an initial state in which a conversion LUT 291a for scanner A is created. The conversion LUT 291a is ideally adjusted. Therefore, XYZ signals output from the conversion LUT 291a show accurate color reproduction with respect to a document scanned by scanner A.

FIG. 26B shows a state in which the ambient conditions (humidity and temperature) of scanner A have varied or scanner A has deteriorated over time as a result of repetitive scans. XYZ signals show inaccurate color reproduction with respect to the document.

In order to obtain XYZ signals that show accurate color reproduction in the state of scanner A whose characteristic has varied in FIG. 26B, a conversion LUT corresponding to the viewing conditions on the input side must be re-created. However, upon re-creating the conversion LUT, RGB to XYZ relationship data of scanner A in the state of FIG. 26B must be obtained again. Furthermore, all conversion LUTs associated with scanner A must be updated to conversion LUTs 291c, as shown in FIG. 26C, by obtaining RGB to XYZ relationship data, every time the characteristic of scanner A has varied.

Figure 27A:
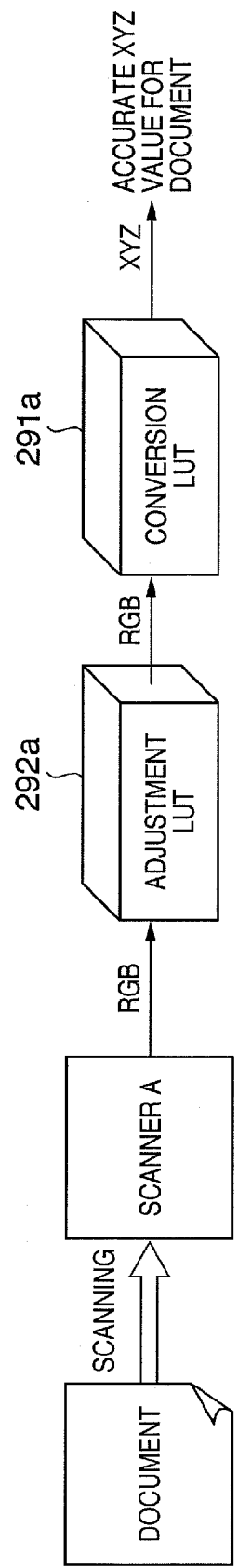
FIGS. 27A and 27B are views for explaining a method of coping with variations of scanner characteristics without updating a conversion LUT in an initial state.
Figure 27B:
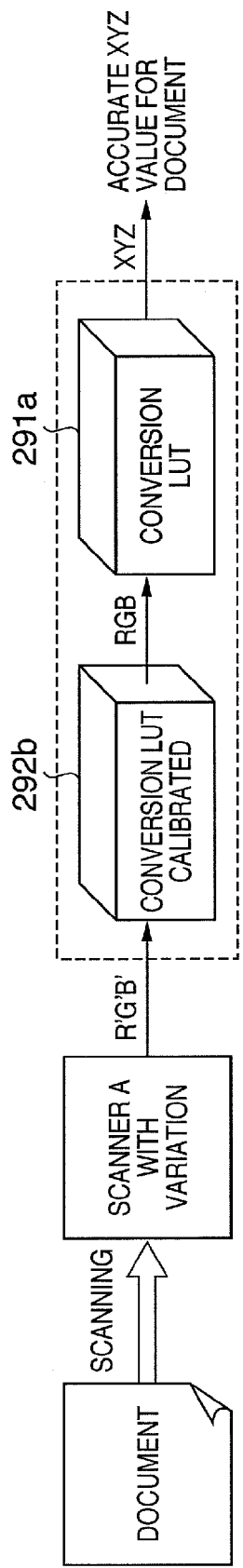

FIGS. 27A and 27B are views for explaining the method of coping with variations of the characteristic of scanner A without updating the conversion LUT in the initial state.

As shown in FIG. 27A, an adjustment LUT 292a that converts RGB signals into ROB signals is added before the conversion LUT 291a in the initial state. The adjustment LUT 292a in the initial state is an LUT, which directly outputs input signals as output signals, i.e., does not perform any conversion in practice. When the characteristic of scanner A has varied, the adjustment LUT 292a is updated to an adjustment LUT 292b to convert input RGB signals into R'G'B' signals, as shown in FIG. 27B. That is, the conversion characteristic obtained by integrating the adjustment LUT 292b and the conversion LUT 291a is the same as that of the re-created conversion LUT 291c shown in FIG. 26C.

Upon updating the adjustment LUT, for example, color samples printed by a printer are measured, and an adjustment LUT which applies color correction to RGB signals to obtain R'G'B' signals is formed so as to accurately reproduce the colors of the color samples 216. That is, the adjustment LUT serves as a calibration LUT for scanner A. As in the processing shown in FIG. 16, upon saving the adjustment LUT 292b in the storing unit 202, the cache data of the existing conversion LUT 291a is integrated with data of the adjustment LUT 292b, and the integrated data is saved in the storing unit 202 (as a device cache) (S310). Of course, all device caches for scanner A are updated to conversion characteristic data obtained by integrating existing conversion LUTs and the adjustment LUT.

As described above, an LUT equivalent to the conversion LUT 291c shown in FIG. 26C can be set as a combination of the conversion LUT 291a and the adjustment LUT 292b. Therefore, color conversion and color correction according to variations of scanner A can be implemented without updating the conversion LUT 291a which is created based on the RGB to XYZ relationship data in the initial state of scanner A.

Fourth Embodiment

Image processing according to the fourth embodiment will be described below. Note that the same reference numerals in the fourth embodiment denote the same parts as in the above description, and a detailed description thereof will be omitted.

Figure 28A:
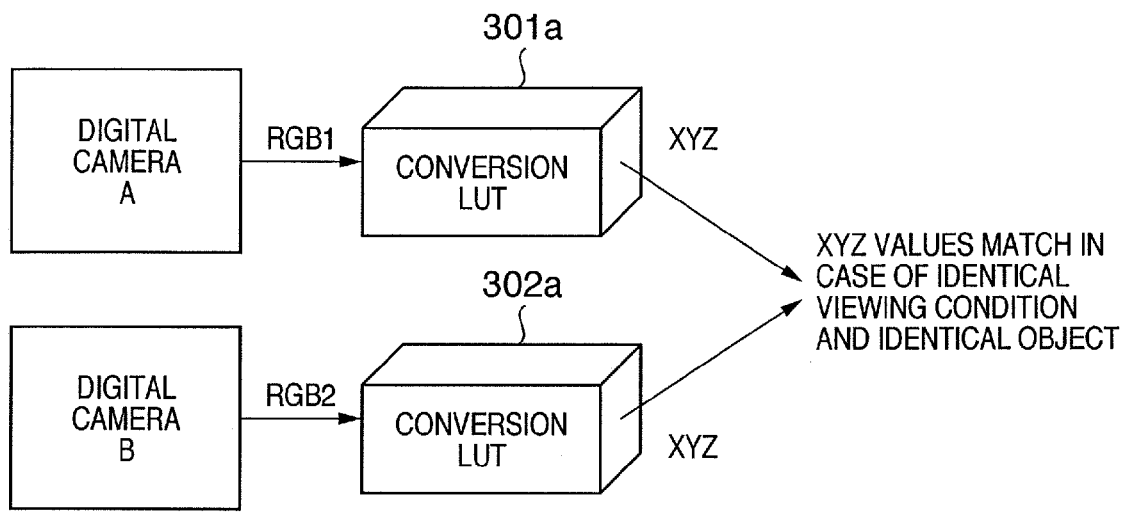
FIGS. 28A and 28B are views showing the arrangement for converting color signals output from a plurality of digital cameras of different models into XYZ signals according to the fourth embodiment.
Figure 28B:
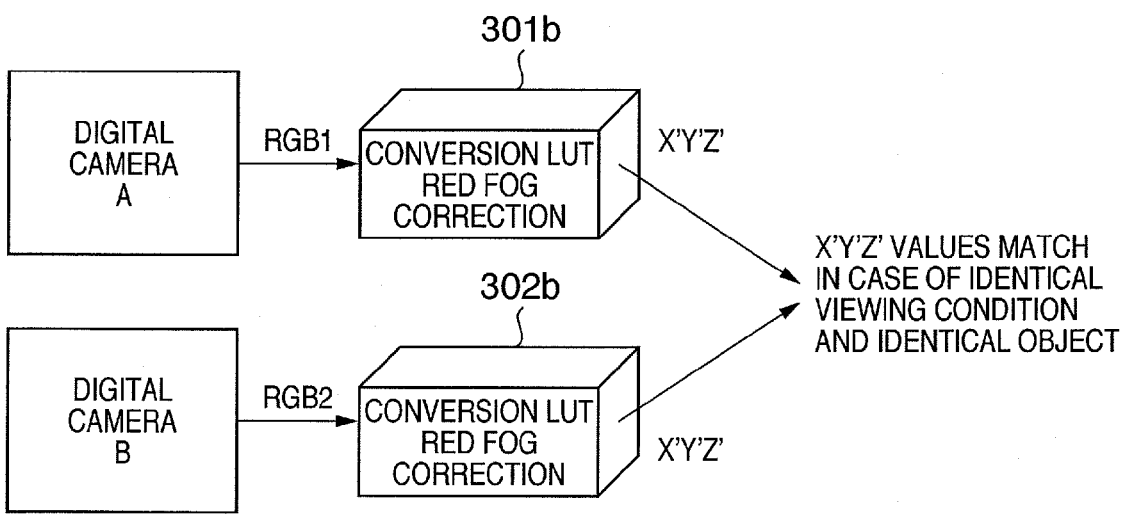

FIGS. 28A and 28B are views showing the arrangement for converting color signals output from a plurality of digital cameras of different models into XYZ signals. Note that a conversion LUT corresponds to the conversion LUT 11 on the input side shown in FIG. 3.

Referring to FIG. 28A, even when digital cameras A and B record an identical object image under identical viewing conditions, RGB signals input to conversion LUTs 301a and 302a assume different values. However, XYZ signals output from the conversion LUTs 301a and 302a assume the same values since they are signals on a device-independent color space.

When color correction for removing any red fog is to always be applied to the conversion LUT 301a for digital camera A, the conversion LUT is edited by adding color correction for removing any red fog to create a conversion LUT 301b, as shown in FIG. 28B. When the same color correction is to be applied to the conversion LUT 302a for digital camera B, a conversion LUT is edited to create a conversion LUT 302b. In this way, upon recording an identical object image under identical viewing conditions, both digital cameras A and B can obtain identical X'Y'Z' signals. However, when identical color correction is to be applied to a plurality of digital cameras of different models, color correction must be applied to the conversion LUT for each digital camera model.

Figure 29A:
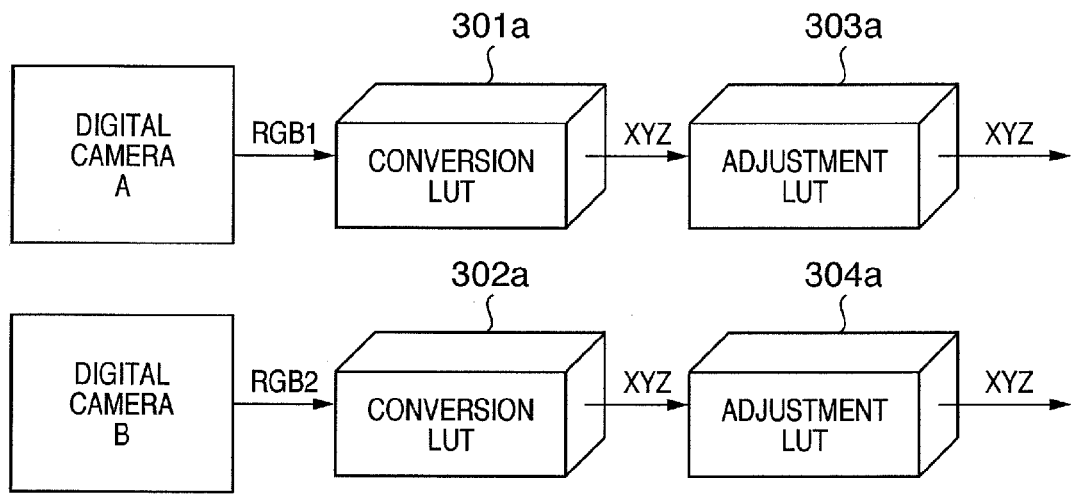
FIGS. 29A and 29B are views for explaining a method of applying color correction without updating a conversion LUT in an initial state.
Figure 29B:
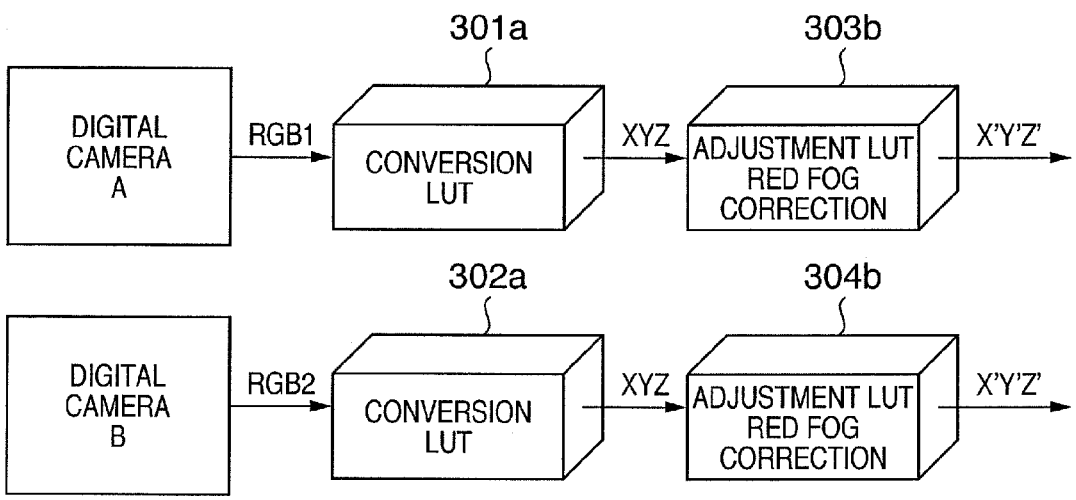

FIGS. 29A and 29B are views for explaining the method of applying color correction without updating the conversion LUT in the initial state.

As shown in FIG. 29A, adjustment LUTs 303a and 304a for converting XYZ signals into XYZ signals are added after the conversion LUTs 301a and 302a in the initial state. The adjustment LUTs 303a and 304a are LUTs, which directly output input signals as output signals, i.e., do not perform any conversion in practice. In case of color correction, as shown in FIG. 29B, the adjustment LUTs are updated to adjustment LUTs 303b and 304b to convert input XYZ signals into X'Y'Z' signals. That is, the conversion characteristic obtained by integrating the conversion LUT 301a and adjustment LUT 303b is the same as that of the conversion LUT 301b that has undergone color correction shown in FIG. 28B. Also, the conversion characteristic obtained by integrating the conversion LUT 302a and adjustment LUT 304b is the same as that of the conversion LUT 302b that has undergone color correction shown in FIG. 28B.

Figure 30:
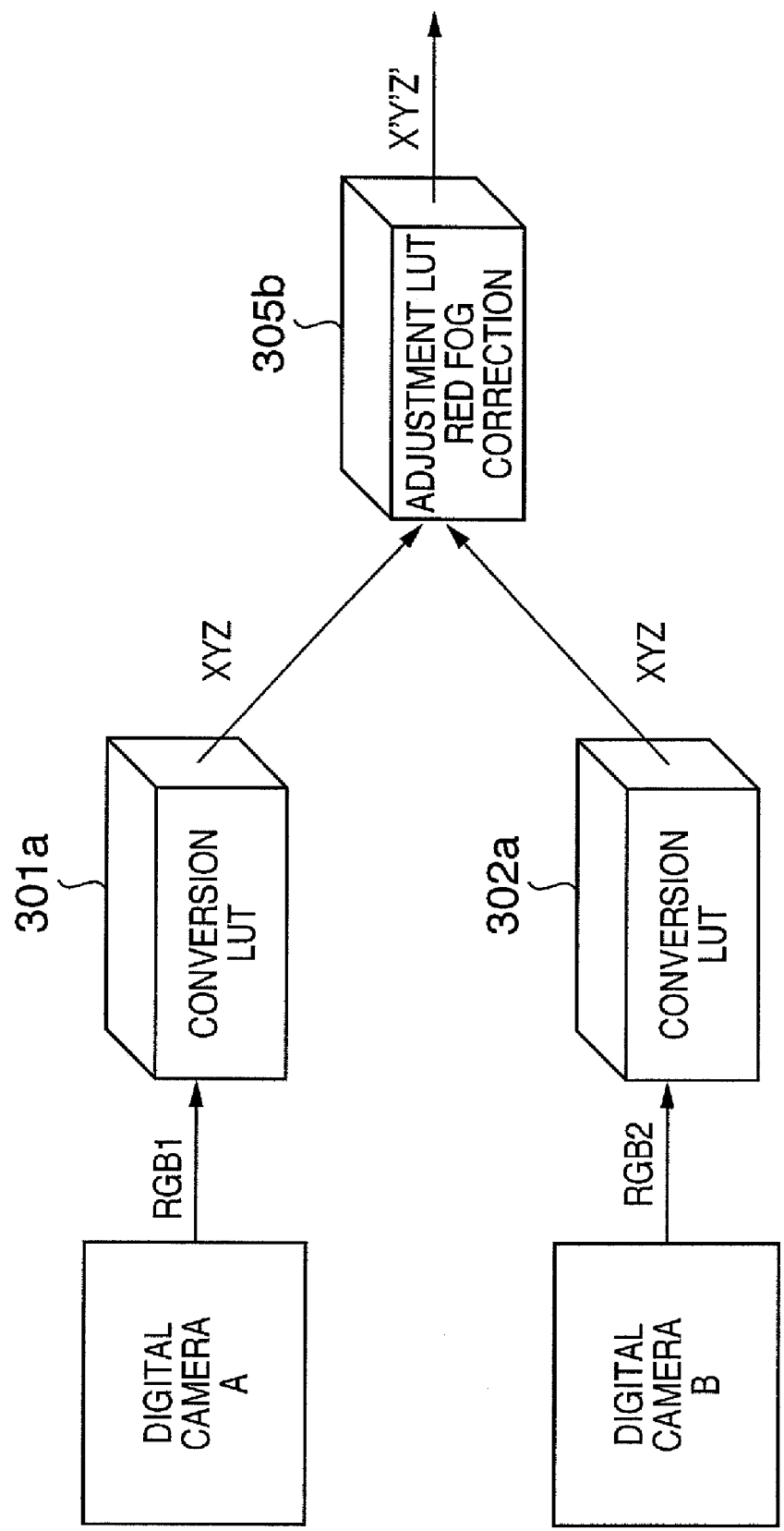
FIG. 30 is a view for explaining use of one adjustment LUT.

Meanwhile, the XYZ signals output from the adjustment LUT are color signals on a device-independent color space. That is, the adjustment LUTs 303b and 304b have the same conversion characteristic, and need not be separately used. Therefore, only one adjustment LUT (adjustment LUT 305b) may be used to receive XYZ signals output from the conversion LUTs 301a and 302a, as shown in FIG. 30.

Since the update method of the adjustment LUT is the same as the method of creating and modifying cache data, and the method of saving the adjustment LUT in the first embodiment, a description thereof will be omitted.

The above description assumes two different models of digital cameras. However, the adjustment LUT can be applied to three or more models of digital cameras.

Fifth Embodiment

Image processing according to the fifth embodiment will be described below. Note that the same reference numerals in the fifth embodiment denote the same parts as in the above description, and a detailed description thereof will be omitted.

As a modification of the first to fourth embodiments, a combination of a new conversion LUT and adjustment LUT will be explained below.

Upon creating device caches of conversion LUTs used in color matching for given input and output devices, adjustment LUTs for the respective input and output devices can be integrated with the newly created conversion LUTs as needed.

Figure 31A:
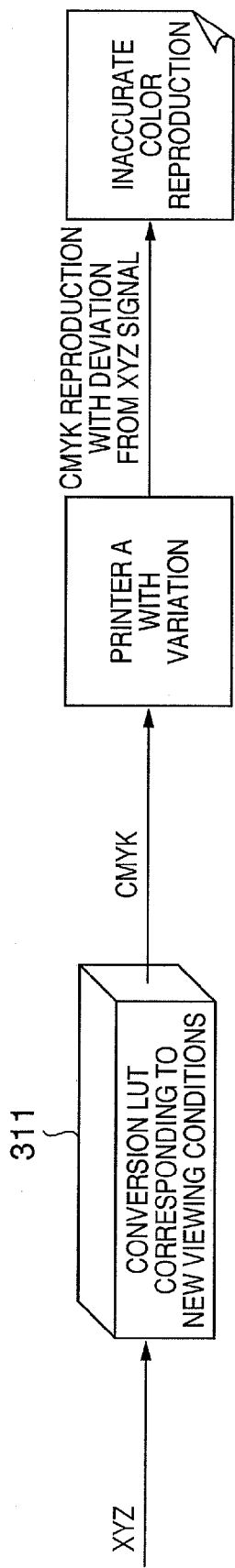
FIGS. 31A to 31C are views for explaining a combination of a new conversion LUT and adjustment LUT according to the fifth embodiment.

For example, as shown in FIG. 31A, a conversion LUT 311 corresponding to viewing conditions on the output side which are different from those used so far is to be created. In this case, CMYK to XYZ relationship data of an existing profile is created based on the initial state of a printer. Therefore, when the characteristic of the printer has varied, the relationship data associated with that printer need to be updated to attain appropriate color matching.

Figure 31B:
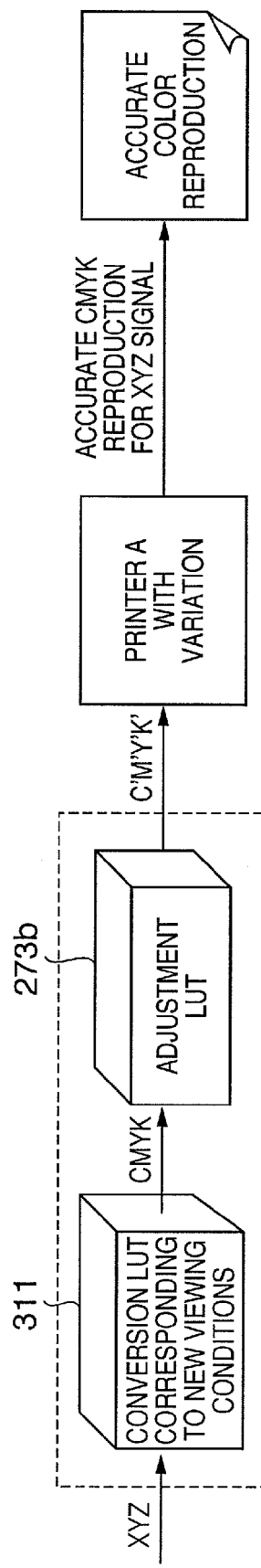
Figure 31C:
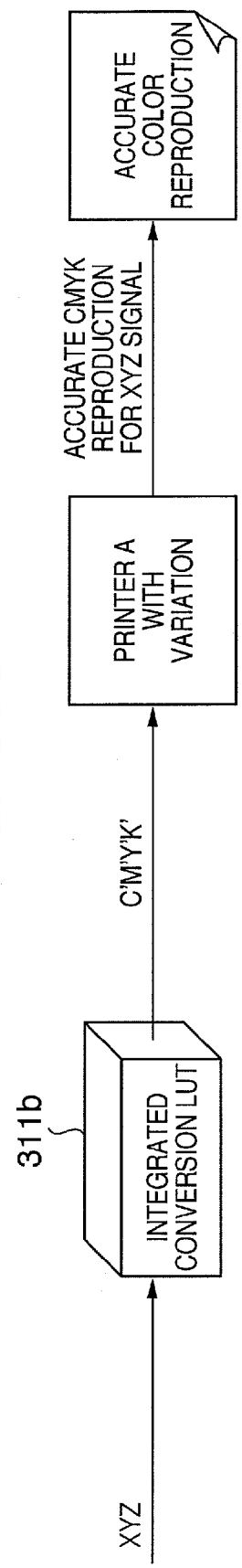

In this case, as shown in FIG. 31B, the adjustment LUT 273b, which is inserted after the conversion LUT, as described in the first embodiment, may be inserted after the conversion LUT 311. Alternatively, as shown in FIG. 31C, an integrated conversion LUT 311b is created by integrating the conversion LUT 311 and adjustment LUT 273b. In this manner, even for the printer whose characteristic has varied from that upon creating the profile which describes the CMYK to XYZ relationship data, accurate color reproduction for XYZ signals can be obtained.

Likewise, the adjustment LUT which is inserted before the conversion LUT and has the calibration function, as described in the third embodiment, may be inserted before or integrated with a new conversion LUT, which is created in correspondence with new viewing conditions on the input side.

Figure 32A:
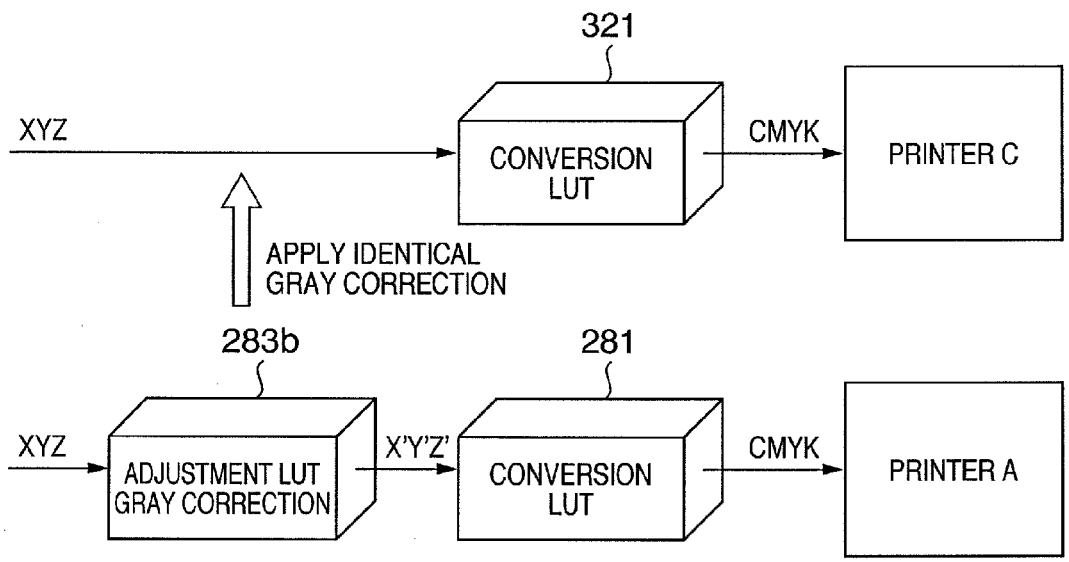
FIGS. 32A and 32B are views for explaining a combination of a new conversion LUT and adjustment LUT.

As shown in FIG. 32A, assume that a new conversion LUT 321 for printer C is generated, and this printer C is added to a clustering printing system to apply gray correction.

Figure 32B:
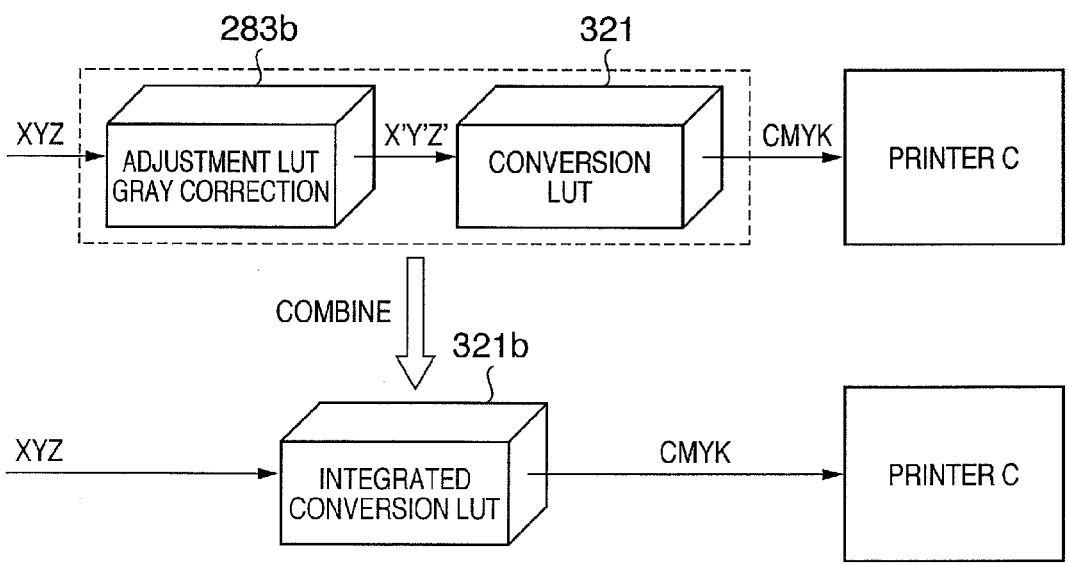

The adjustment LUT 283b which is described in the second embodiment and is inserted before the conversion LUT converts device-independent XYZ signals into XYZ signals. Therefore, by inserting the adjustment LUT 283b before the conversion LUT 321, as shown in FIG. 32B, gray correction can also be set for printer C. Furthermore, an integrated conversion LUT 321b may be obtained by integrating the conversion LUT 321 and the adjustment LUT 283b.

Likewise, the adjustment LUT which is inserted after the conversion LUT and has undergone color correction, as described in the fourth embodiment, may be inserted after or integrated with a new conversion LUT, which is created in correspondence with new viewing conditions on the input side.

Sixth Embodiment

Image processing according to the sixth embodiment will be described below. Note that the same reference numerals in the sixth embodiment denote the same parts as in the above description, and a detailed description thereof will be omitted.

As has already been described above, color matching configured by an input device and its viewing conditions, a gamut mapping mode, and an output device and its viewing conditions can be speeded up by generating and utilizing a system cache which combines all color conversion LUTs of respective stages.

As shown in FIG. 33A, a system cache 331 for printer A directly converts color signals (RGB signals in FIG. 33A) input from an input device into CMYK signals on the color space of printer A. In this state, if the characteristic of printer A has varied, color reproduction of a printout of printer A becomes inaccurate. If device caches are updated every calibration required to obtain accurate color reproduction for printer A, and the system cache is updated based on the updated device caches, complicated processing is required.

Hence, as shown in FIG. 33B, a calibrated adjustment LUT 273b is directly combined to the system cache 331 for printer A. In this way, when the characteristic of printer A has varied, the system cache is updated without updating device caches, and accurate color matching can be attained. That is, management of the color matching system can be simplified and speeded up.

Figure 34A:
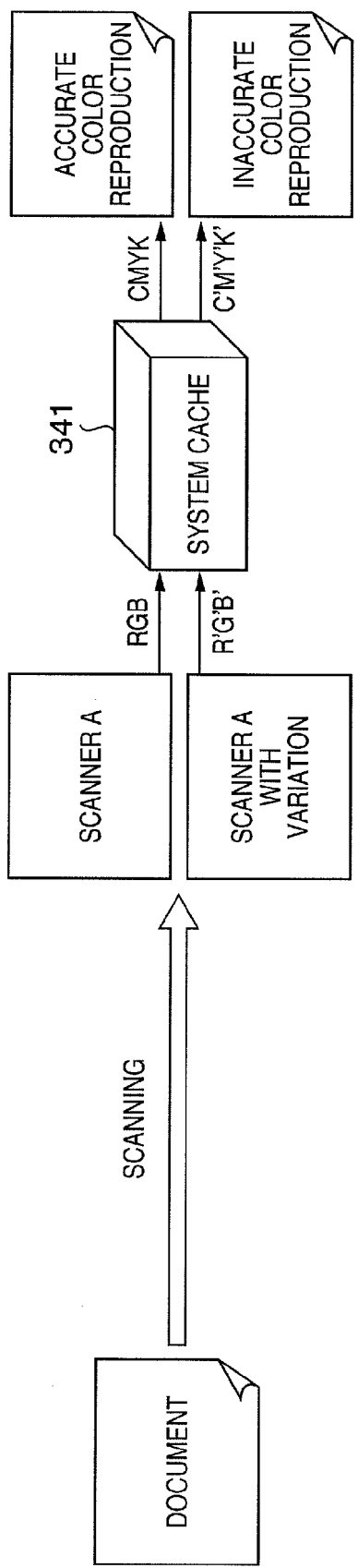
FIGS. 34A and 34B are views for explaining a combination of a system cache and adjustment LUT.

As shown in FIG. 34A, a system cache 341 for scanner A directly converts RGB signals input from scanner A into color signals (CMYK signals in FIG. 34A) on the color space of an output device. In this state, when the characteristic of scanner A has varied, color reproduction of the obtained color signals becomes inaccurate. If device caches are updated every calibration required to obtain accurate color reproduction for scanner A, and the system cache is updated based on the updated device caches, complicated processing is required.

Figure 34B:
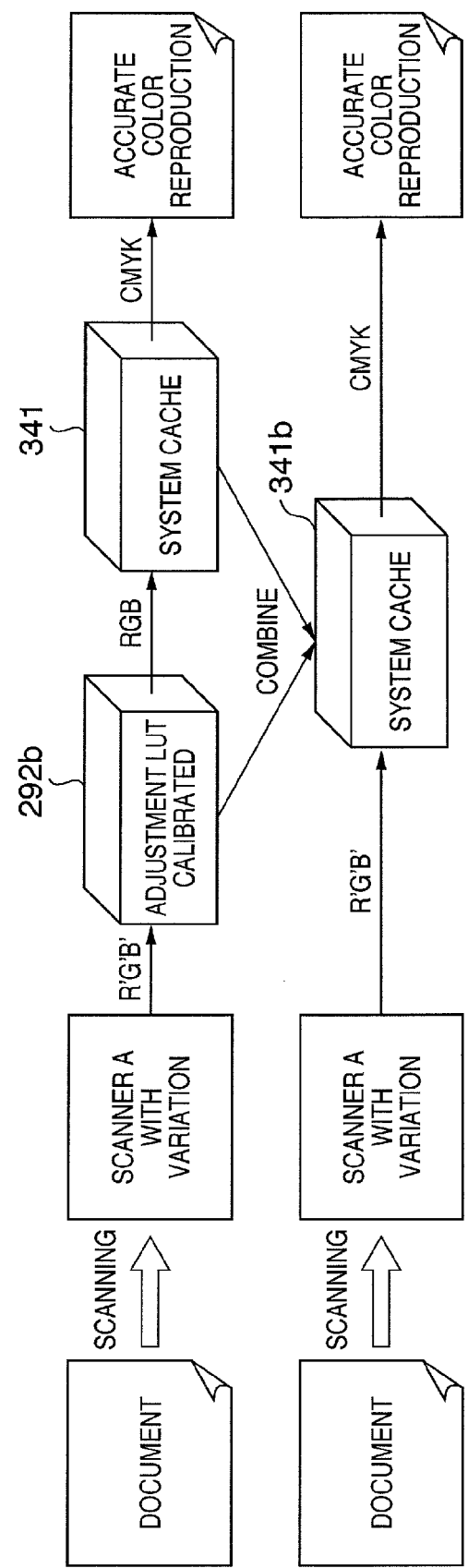

Hence, as shown in FIG. 34B, a calibrated adjustment LUT 292b is directly combined to the system cache 341 for scanner A. In this way, when the characteristic of scanner A has varied, the system cache is updated without updating device caches, and accurate color matching can be attained. That is, management of the color matching system can be simplified and speeded up.

Seventh Embodiment

As has already been described in the sixth embodiment, when the adjustment LUT to be inserted in the front stage of the output device is updated, the system cache can be updated without updating device caches, and accurate color matching can be attained.

Feasibility of simultaneous implementation of speeding up of all color conversions associated with, e.g., output device A upon assuming output device A described above will be explained below.

Figure 35:
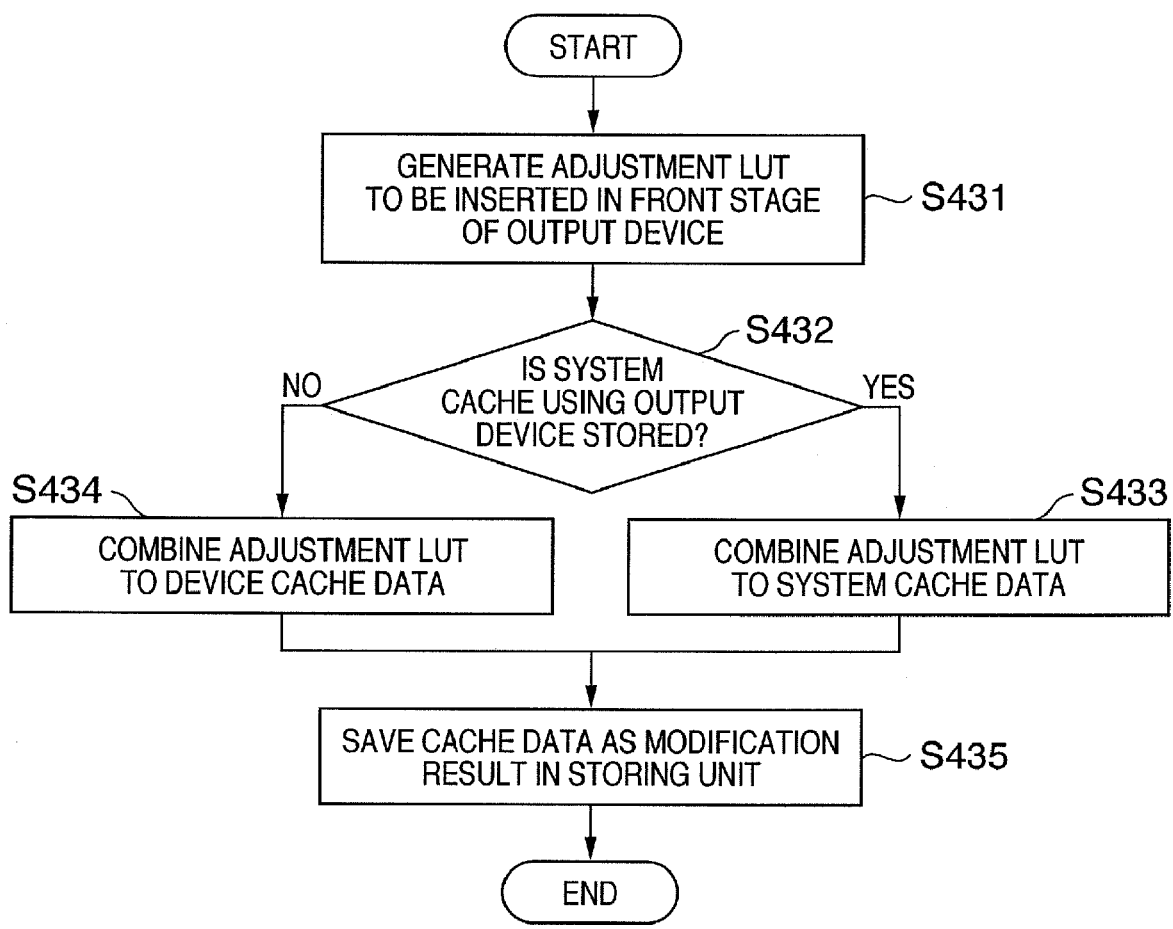
FIG. 35 is a flowchart showing processing upon creation of a rear-stage adjustment LUT for an output device according to the seventh embodiment.

As shown in FIG. 35, assume that an adjustment LUT to be inserted in the front stage of output device A is generated (S431). A search in the storing unit 202 for a system cache corresponding to output device A is made (S432). If the system cache is found, all system caches associated with output device A are modified by combining the adjustment LUT to the rear stage of each system cache (S433). The system caches as the modification results are saved in the storing unit 202 (S435).

In this manner, upon generation of the LUT to be inserted in the front stage of the output device A, all system caches corresponding to output device A are modified, and speeding up of color conversion associated with output device A can be simultaneously implemented. In this case, the need for updating CMYK to XYZ relationship data of output device A and re-configuring system caches associated with updating of the device caches of output device A can be obviated.

As has already been described above, if no system cache using output device A is stored, device caches are modified by combining the same adjustment LUT, and are saved in the storing unit 202 (S434). In this manner, device caches of color conversions corresponding to output device A can be newly updated without updating CMYK to XYZ relationship data of output device A.

As has already been explained in the sixth embodiment, when the adjustment LUT to be inserted in the rear stage of the input device is updated, the system cache can be updated without updating device caches, and accurate color matching can be attained.

Feasibility of simultaneous implementation of speeding up of all color conversions associated with, e.g., input device B upon assuming input device B described above will be explained below.

Figure 36:
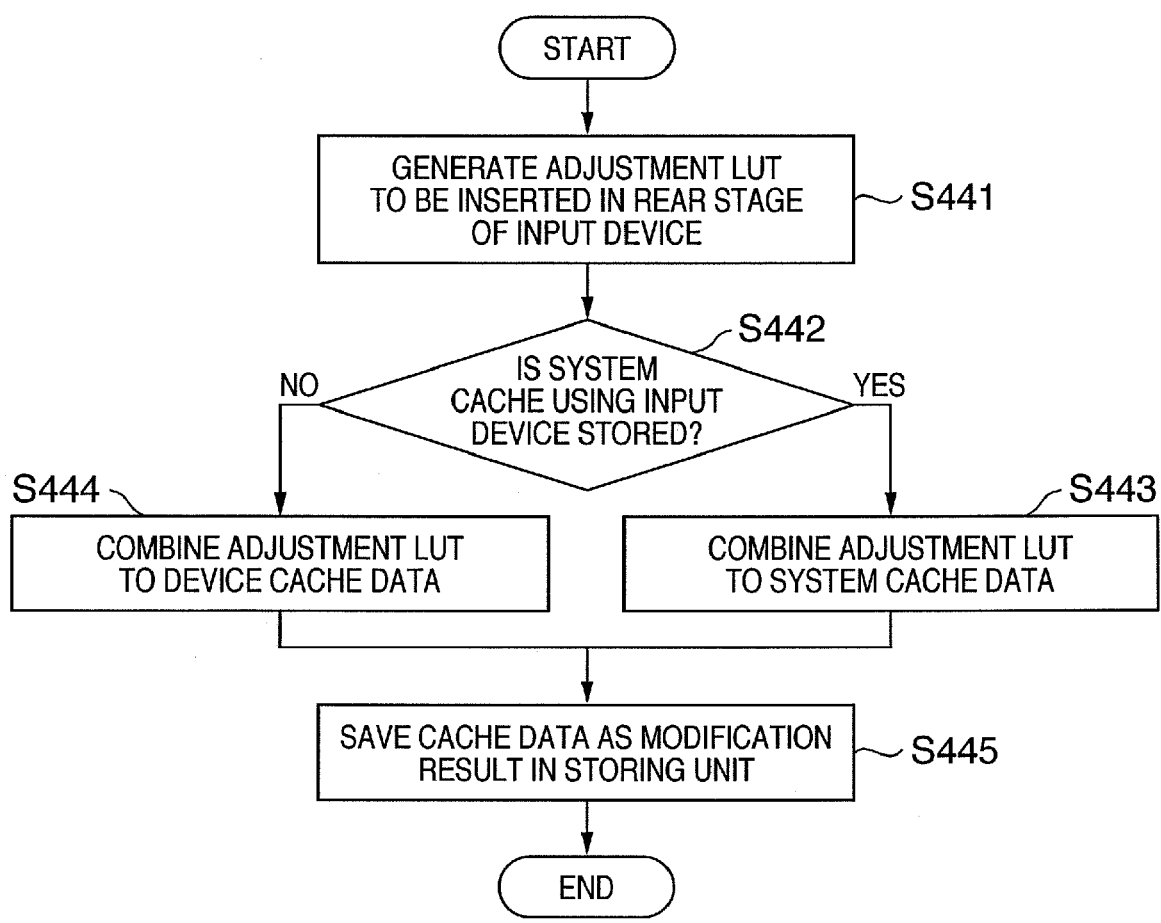
FIG. 36 is a flowchart showing processing upon creation of a front-stage adjustment LUT for an input device.

As shown in FIG. 36, assume that an adjustment LUT to be inserted in the rear stage of input device B is generated (S441). A search in the storing unit 202 for a system cache corresponding to input device B is made (S442). If the system cache is found, all system caches associated with input device B are modified by combining the adjustment LUT to the front stage of each system cache (S443). The system caches as the modification results are saved in the storing unit 202 (S445).

In this manner, upon generation of the LUT to be inserted in the rear stage of the input device B, all system caches corresponding to input device B are modified, and speeding up of color conversion associated with input device B can be simultaneously implemented. In this case, the need for updating XYZ to RGB relationship data of input device B and re-configuring system caches associated with updating of the device caches of input device B can be obviated.

As has already been described above, if no system cache using input device B is stored, device caches are modified by combining the same adjustment LUT, and are saved in the storing unit 202 (S444). In this manner, device caches of color conversions corresponding to input device B can be newly updated without updating XYZ to RGB relationship data of input device B.

Modification of Embodiments

In the examples of the above embodiments, the adjustment LUT includes one LUT. However, the adjustment LUT may include a plurality of LUTs having identical input and output color space interfaces, and may implement a function equivalent to a single LUT.

In the above description, a module having a color conversion function has been described as an LUT. However, in place of the LUT, a conversion module such as a conversion matrix, a program having a conversion algorithm, and the like can cope with the characteristic variations of a printer by the aforementioned method.

Other Embodiments

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code itself installed in the computer also implements the present invention. In other words, the claims of the present invention also cover a computer program for the purpose of implementing the functions of the present invention.

In this case, so long as the system or apparatus has the functions of the program, the program may be executed in any form, e.g., as object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

Further, it is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Furthermore, besides the case where the aforesaid functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-262985, filed on Sep. 9, 2005, which is hereby incorporated by reference herein in their entirety.

What is claimed is:

1. A method of applying an input conversion for converting data of a color space dependent on an input device into data on a device-independent color space, applying a gamut conversion for converting into data on a gamut of an output device to the result of the input conversion, and applying an output conversion for converting into data on a color space dependent on the output device to the result of the gamut conversion, comprising the steps of:
    converting input data into output data using conversion tables for the input conversion and the output conversion, which are created for each of the input device and output device and for each conversion setting, and a conversion adjustment table; and
    modifying the conversion adjustment table in correspondence with a variation of a color reproduction characteristic of one of the input device and the output device, or color correction for one of the input device and the output device.

2. The method according to claim 1, wherein the conversion adjustment table in an initial state has a characteristic for directly outputting input data.

3. The method according to claim 1, wherein the converting step includes a step of performing conversion by inserting the conversion adjustment table corresponding to the variation of the color reproduction characteristic of the input device or the color correction for the input device in a rear stage of the conversion tables.

4. The method according to claim 1, wherein the converting step includes a step of performing conversion by inserting one conversion adjustment table for the color correction corresponding to a plurality of input devices in a rear stage of the conversion tables.

5. The method according to claim 1, wherein the converting step includes a step of performing conversion by inserting the conversion adjustment table corresponding to the variation of the color reproduction characteristic of the output device and the color correction for the output device in a rear stage of the conversion tables.

6. The method according to claim 1, wherein the converting step includes a step of performing conversion by inserting one conversion adjustment table for the color correction corresponding to a plurality of output devices in a front stage of the conversion tables.

7. The method according to claim 1, further comprising the step of generating a combined conversion table by combining the conversion tables and the conversion adjustment table in correspondence with the input conversion and the output conversion.

8. The method according to claim 1, further comprising the step of generating an integrated conversion table obtained by integrating the conversion tables for the input conversion and the output conversion, which are created for each of the input device and output device and for each conversion setting, the conversion adjustment table, and a conversion table for the gamut conversion.

9. A color processing apparatus for applying an input conversion for converting data of a color space dependent on an input device into data on a device-independent color space, applying a gamut conversion for converting into data on a gamut of an output device to the result of the input conversion, and applying an output conversion for converting into data on a color space dependent on the output device to the result of the gamut conversion, comprising:
    a converter, arranged to convert input data into output data using conversion tables for the input conversion and the output conversion, which are created for each of the input device and output device and for each conversion setting, and a conversion adjustment table; and
    a modifier, arranged to modify the conversion adjustment table in correspondence with a variation of a color reproduction characteristic of one of the input device and the output device, or color correction for one of the input device and the output device.

10. A computer-readable storage medium storing a computer-executable program for causing a computer to perform a method of applying an input conversion for converting data of a color space dependent on an input device into data on a device-independent color space, applying a gamut conversion for converting into data on a gamut of an output device to the result of the input conversion, and applying an output conversion for converting into data on a color space depending on the output device to the result of the gamut conversion, the method comprising the steps of:
    converting input data into output data using conversion tables for the input conversion and the output conversion, which are created for each of the input device and output device and for each conversion setting, and a conversion adjustment table; and
    modifying the conversion adjustment table in correspondence with a variation of a color reproduction characteristic of one of the input device and the output device, or color correction for one of the input device and the output device.

* * * * *